(12) United States Patent
Yamaguchi et al.

(10) Patent No.: US 6,325,182 B1
(45) Date of Patent: Dec. 4, 2001

(54) MOTOR-DRIVEN BRAKE SYSTEM

(75) Inventors: Tohma Yamaguchi; Youichi Kumemura; Yukio Ohtani; Takuya Usui, all of Kanagawa-ken (JP)

(73) Assignee: Tokico, Ltd., Kanagawa-ken (JP)

( * ) Notice: Subject to any disclaimer, the term of this patent is extended or adjusted under 35 U.S.C. 154(b) by 0 days.

(21) Appl. No.: 09/273,263

(22) Filed: Mar. 22, 1999

(30) Foreign Application Priority Data

Mar. 27, 1998 (JP) .................................................. 10-082219
Nov. 13, 1998 (JP) .................................................. 10-341055

(51) Int. Cl.⁷ .................................................... F16D 55/08
(52) U.S. Cl. ........................ 188/72.8; 188/72.1; 188/162
(58) Field of Search .................................. 188/71.8, 71.7, 188/71.9, 72.1, 161, 162, 196 R, 370, 72.8

(56) References Cited

U.S. PATENT DOCUMENTS

| 4,836,338 | * | 6/1989 | Taig .................................... 188/72.1 |
| 5,788,023 | * | 8/1998 | Schoner et al. ..................... 188/72.7 |
| 5,829,557 | * | 11/1998 | Halasy-Wimmer et al. ........ 188/162 |
| 5,931,268 | * | 8/1999 | Kingston et al. .................... 188/162 |
| 5,971,110 | * | 10/1999 | Martin ................................ 188/72.1 |
| 6,000,507 | * | 12/1999 | Bohm et al. ........................ 188/158 |
| 6,059,076 | * | 5/2000 | Dietrich et al. ..................... 188/156 |

FOREIGN PATENT DOCUMENTS

97/13988    4/1997  (WO).

OTHER PUBLICATIONS

Patent Abstracts of Japan, Publication No. 08296674, dated Nov. 12, 1996.
Von Jürgen Balz et al., Konzept für eine elektromechanische Fahrzeugbremse, 1996, pp. 328–333.

* cited by examiner

Primary Examiner—Robert J. Oberleitner
Assistant Examiner—Mariano Sy
(74) Attorney, Agent, or Firm—Wenderoth, Lind & Ponack, L.L.P.

(57) ABSTRACT

The present invention provides a motor driven brake system for generating and releasing braking forces by reciprocal movement of a pair of pads disposed at opposite sides of a disk having an axis. The system comprises a single electric motor, an output portion adapted to be rotated by the electric motor, a first pad pressing member for pressing a first pad against the disk a second pad pressing member for pressing a second pad against the disk, a first converting mechanism and second converting mechanism. The first converting mechanism converts rotation of the output portion to a linear motion so as to move the first pad pressing member reciprocally along the axis of the disk. The second converting mechanism converts rotation of the output portion to a linear motion so as to move the second pad pressing member reciprocally along the axis of the disk.

25 Claims, 13 Drawing Sheets

MOTOR-DRIVEN BRAKE SYSTEM

BACKGROUND OF THE INVENTION

The present invention relates to a motor-driven brake system which is advantageously used for a vehicle.

As a motor-driven brake system, there can be mentioned, for example, a brake system of the type disclosed in Unexamined Japanese Patent Application Public Disclosure No. 3-45462. The brake system of this type comprises a pair of pads disposed at opposite sides of a disk, and a caliper for pressing the pads against the disk to generate a braking force. As the caliper, generally, a so-called floating type caliper which is movable along the axis of the disk is employed.

The floating type caliper comprises: a motor; a first movable member disposed at the opposite side of one pad from the disk and adapted to be moved directly by the motor; and a second movable member supporting the motor and having a claw portion disposed at the opposite side of the other pad from the disk. When the first movable member is moved by the motor to press the one pad against the disk, a reaction force acts to move the second movable member relative to the disk to thereby press the claw portion against the other pad, which is in turn pressed against the disk. Thus, the two pads move from opposite directions and press against the disk, thereby generating a braking force.

However, the above-mentioned floating type caliper poses the following problems:

In order to release the braking force, the motor is operated in a reverse direction, so that the first movable member is moved in a direction for releasing the pressure by which the one pad has applied to the disk. That is, since the first movable member is moved directly by the motor, the one pad which has been pressed by the first movable member is easily moved away from the disk. On the other hand, however, the second movable member which is not moved directly by the motor cannot enable the other pad to be moved away from the disk, so that the other pad drags against the disk. Consequently, not only does the lifetime of the pad and the disk become short, but also fuel consumption becomes high.

SUMMARY OF THE INVENTION

In order to solve the above-mentioned problems, the present invention has been made. It is a primary object of the present invention to provide a motor-driven brake system which prevents dragging of the pads to thereby extend the lifetime of the pads and the disk and also to suppress fuel consumption.

According to the present invention, there is provided a motor-driven brake system comprising:

a first pad and a second pad disposed at axially opposite sides of a disk, each of the pads having two opposite surfaces, one of which surfaces is adapted to abut against the disk;

a caliper for pressing the other surface of each of the first and second pads, to thereby press the pads against the disk and generate a braking force, the caliper including a housing capable of being mounted on a non-rotatable portion of a vehicle body, the housing containing a single electric motor;

an output portion adapted to be rotatably driven by the electric motor; and a converting device for converting rotation of the output portion to a linear motion, the converting device including a first threaded portion and a second threaded portion having a directionally reverse relationship with each other;

a first pad pressing member disposed at one side of the disk and having one end engaged with the first threaded portion of the converting device and the other end capable of abutting against the first pad; and a second pad pressing member extending across an outer periphery of the disk and having one end engaged with the second threaded portion of the converting device and the other end capable of abutting against the second pad, whereby the first and second pad pressing members are capable of moving linearly reciprocally so that one of the first and second pad pressing members moves in a direction opposite to the movement of the other pad pressing member.

In the motor-driven brake system arranged as mentioned above, there is provided a converting device which is rotated by an electric motor and which has a first threaded portion and a second threaded portion having a directionally reverse relationship with each other. The first threaded portion of the converting device is engaged with a first pad pressing member and the second threaded portion of the converting device is engaged with a second pad pressing member. By this arrangement, when the converting device is rotated in a predetermined direction by the electric motor in order to release a braking force, the first pad pressing member and the second pad pressing member move in opposite directions. Therefore, each of the pads which have been pressed by the first and second pad pressing members can be easily moved away from the disk, to thereby prevent dragging.

According to the present invention, the first and second pad pressing members are movable along the axis of the disk, relative to the housing containing the motor.

According to the present invention, the first threaded portion comprises a first externally threaded portion formed in the output portion and an internally threaded portion formed on one end of the first pad pressing member for engagement with the first externally threaded portion, and the second threaded portion comprises a second externally threaded portion formed in the output portion and an internally threaded portion formed on one end of the second pad pressing member for engagement with the second externally threaded portion.

According to a first embodiment of the present invention, each of the first threaded portion and the second threaded portion has a ball screw structure.

According to one aspect of the first embodiment of the present invention, the ball screw structure includes a thread groove having a length of less than 1 pitch. By this arrangement, a high transmission ratio of the ball screw structure can be achieved.

According to another aspect of the first embodiment of the present invention, the motor-driven brake system further comprises a pad wear compensating mechanism for adjusting starting positions of the pads along the axis of the disk before operation of the first and second pad pressing members, whereby when an amount of rotation of the output portion exceeds a predetermined level during movement of the pads toward the disk caused by operation of the first and second pad pressing members, the starting positions of the pads are adjusted to positions closer to the disk relative to the starting positions before the amount of rotation of the output portion exceeds the predetermined level.

By this arrangement, when at least one of the first and second pads has been worn and rotation of the output portion driven by the electric motor exceeds a predetermined range during movement of the pads toward the disk caused by operation of the first and second pad pressing members, a pad clearance between the disk and each pad can be adjusted.

According to yet another aspect of the first embodiment of the present invention, the output portion comprises a cylindrical rotor member, the rotor member receiving the first pad pressing member on a side of a distal end portion thereof through the first threaded portion and receiving the pad wear compensating mechanism on a side of a base end portion thereof, the first pad pressing member comprising:
a generally cylindrical inner body adapted to be reciprocally moved by the first threaded portion; and
a piston threadably engaged with an inner circumferential surface of the inner body and having a distal end associated with the first pad and a base end associated with the pad wear compensating mechanism, the pad wear compensating mechanism comprising:
a detection device for detecting an amount of wear of at least one of the first and second pads; and
a one-way rotation transmitting device for preventing a rotation transmission path from the rotor member to the piston when the rotor member rotates in one direction during movement of the pads toward the disk caused by operation of the first and second pad pressing members, while establishing the rotation transmission path from the rotor member to the piston when the rotor member rotates in the other direction during movement of the pads away from the disk caused by operation of the first and second pad pressing members, to thereby move the piston toward the disk relative to the inner body by a distance corresponding to the amount of wear of the at least one pad.

According to an additional aspect of the present invention, the caliper includes an attachment device for attachment in a manner permitting floating movement of the caliper relative to the non-rotational portion of the vehicle body.

By this arrangement, the caliper is made movable. Therefore, when run-out of the disk occurs, the caliper moves along the axis of the disk, so that the first and second pad pressing member also move, thus enabling both of the pads pressed by the pad pressing members to follow the run-out of the disk.

According to another additional aspect of the present invention, the caliper includes a fixing device for fixing the caliper relative to the non-rotational portion of the vehicle body. According to the present invention, there is also provided a motor-driven brake system for generating and releasing braking forces by reciprocal movement of a pair of pads disposed at opposite sides of a disk having an axis, the pads being adapted to move toward and away from the disk along the axis thereof,
the brake system comprising:
a single electric motor;
an output portion adapted to be rotated by the electric motor;
a first pad pressing member for pressing a first pad against a disk having an axis,
the first pad disposed at one side of the disk;
a second pad pressing member for pressing a second pad against the disk,
the second pad being disposed at the opposite side of the disk from the first pad;

a first converting mechanism for converting rotation of the output portion to a linear motion so as to move the first pad pressing member reciprocally along the axis of the disk; and
a second converting mechanism for converting rotation of the output portion to a linear motion so as to move the second pad pressing member reciprocally along the axis of the disk.

According to the present invention, the motor-driven brake system further comprises a caliper for housing the electric motor, the caliper including a fixing device for fixing the caliper relative to a non-rotational portion of a vehicle body.

In a second embodiment of the present invention, the electric motor may have an output shaft, and the output portion may comprise the output shaft, a rotation transmitting member and a sliding mechanism portion for permitting axial movement of the rotation transmitting member relative to the output shaft while restricting relative rotation therebetween, the rotation transmitting member having a small-diameter portion on a side of a distal end portion thereof and a large-diameter portion on a side of a base end portion thereof,
the small-diameter portion having formed therein a first externally threaded portion and the large-diameter portion having formed therein a second externally threaded portion. Further, the first pad pressing member may have a first internally threaded portion on a side of a base end portion thereof and the second pad pressing member may have a second internally threaded portion on a side of a base end portion thereof,
the first externally threaded portion and the first internally threaded portion constituting the first converting mechanism,
the second externally threaded portion and the second internally threaded portion constituting the second converting mechanism,
the first externally threaded portion and the second externally threaded portion having equal leads and having a directionally reverse relationship with each other.

By this arrangement, axial movement of the rotation transmitting member is permitted. Therefore, when run-out of the disk occurs, the rotation transmitting member moves along the axis of the disk, so that the first and second pad pressing members threadably engaged with the rotation transmitting member also move, thus enabling both of the pads pressed by the pad pressing members to follow the run-out of the disk. In addition, since the rotation transmitting member is movable along the axis of the disk, it is unnecessary to move the caliper as a whole along the axis of the disk, so that the weight of the member to be moved can be reduced, thereby suppressing a resistance to sliding movement.

The foregoing and other objects, features and advantages will be apparent to those skilled in the art from the following detailed description and claims taken in connection with the accompanying drawings.

DETAILED DESCRIPTION OF THE INVENTION

Figure 1:
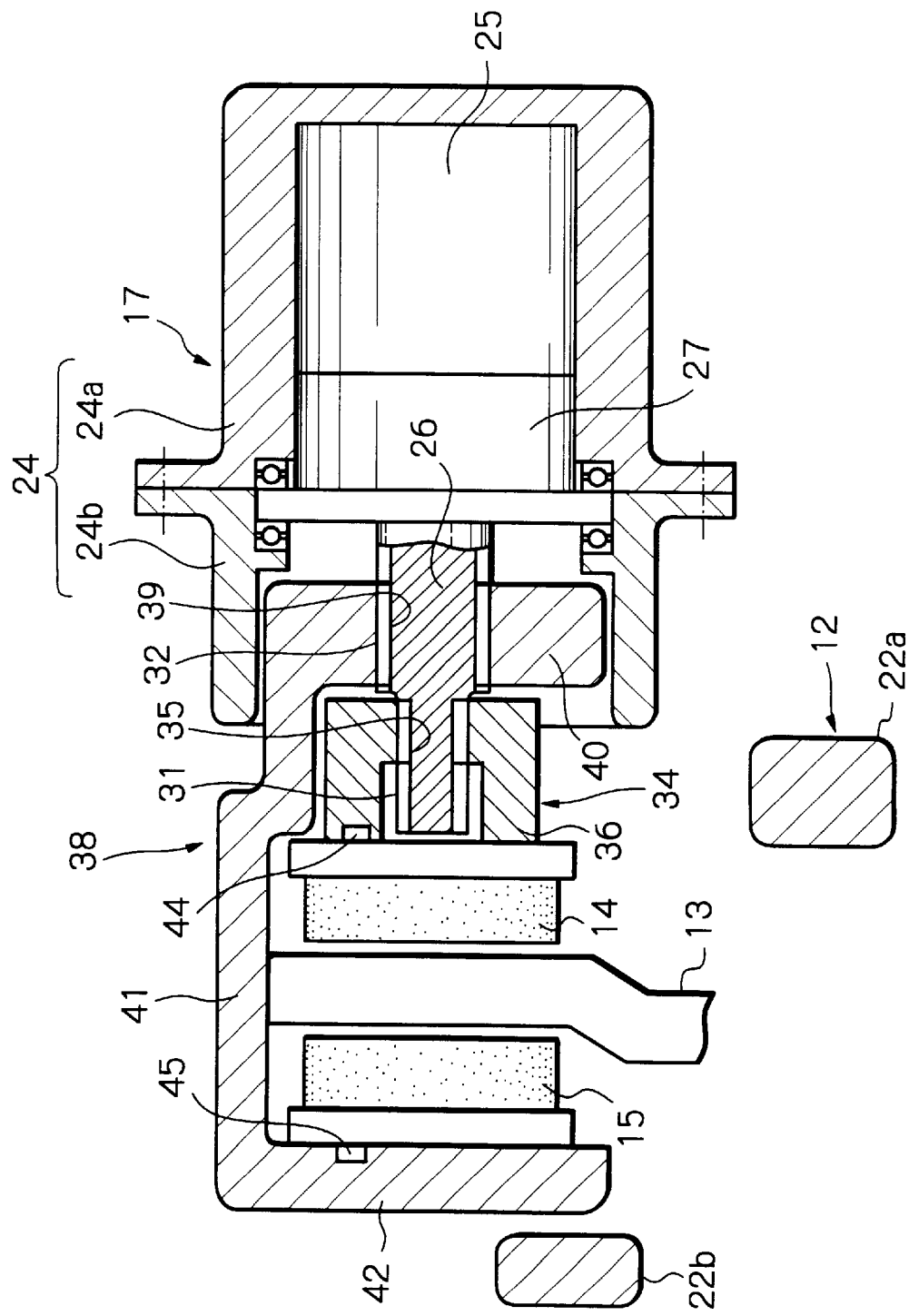
FIG. 1 is a side cross-sectional view of a motor-driven brake system according to a first embodiment of the present invention.
Figure 2:
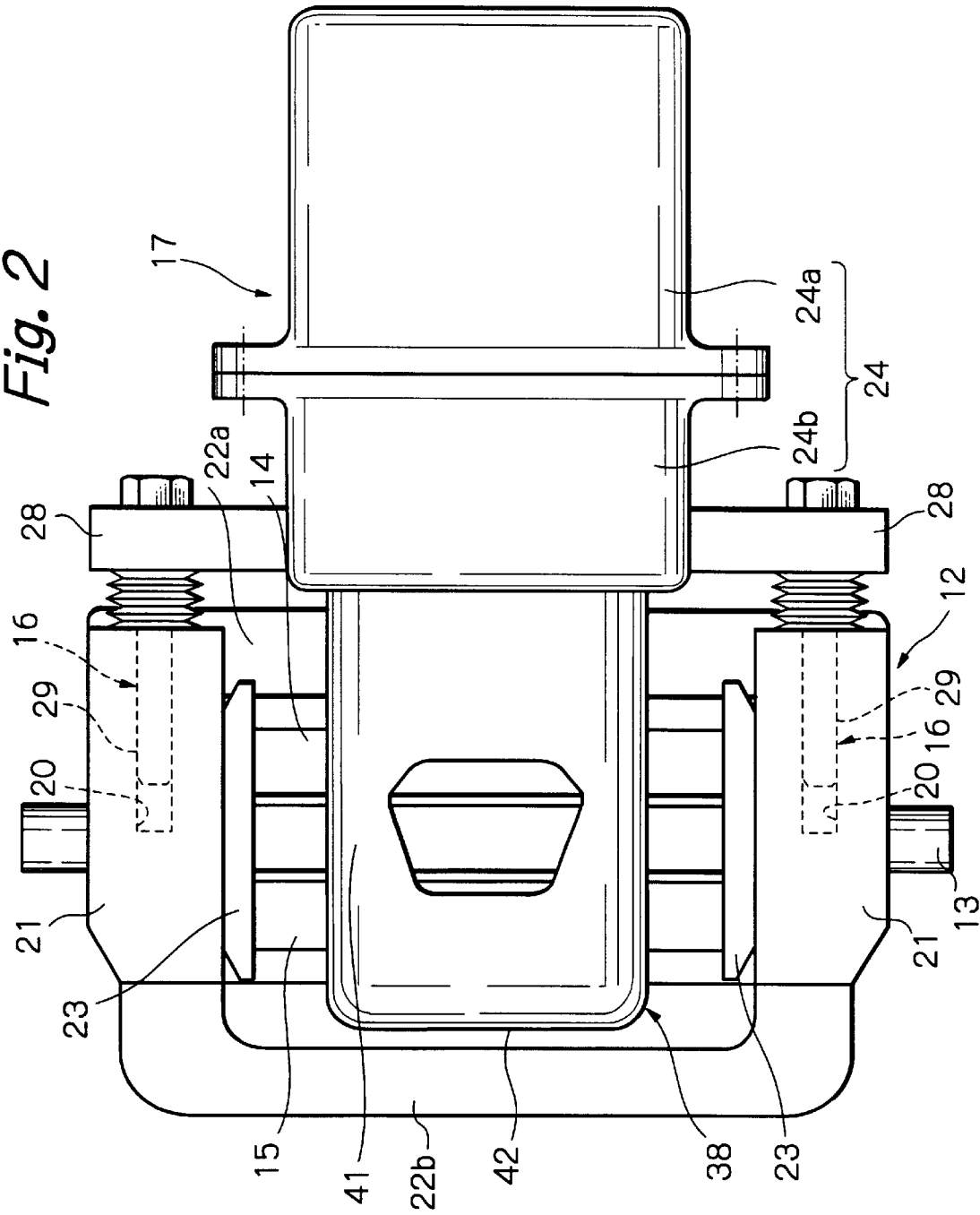
FIG. 2 is a plan view of the motor-driven brake system according the first embodiment of the present invention.

Referring to FIGS. 1 and 2, explanation is made below on a motor-driven brake system according to a first embodiment of the present invention.

The motor-driven brake system in this embodiment comprises: a carrier 12 fixed on a non-rotatable portion of a vehicle body; an inner pad 14 and an outer pad 15 slidably supported by the carrier 12 at opposite sides of a disk 13; and a caliper 17 supported by the carrier 12 and capable of holding the inner pad 14 and the outer pad 15 at opposite sides thereof. The caliper 17 and the carrier 12 constitute two sliding guide portions 16 which permit sliding movement of the caliper 17 along the axis of the disk 13.

The carrier 12 comprises: two supporting portions 21, 21 each having a guide bore 20; a first connecting portion 22a connecting the supporting portions 21 on a side of open ends of the guide bores 20; and a second connecting portion 22b connecting the supporting portions 21 on a side of closed ends of the guide bores 20.

The carrier 12 is fixed on the non-rotatable portion of the vehicle body relative to the disk 13, such that the supporting portions 21 are positioned at circumferentially opposite ends of the disk 13, and such that the guide bores 20 in the supporting portions 21 extend along the axis of the disk 13 (in a lateral direction in FIGS. 1 and 2).

A pair of guides 23 are positioned inwardly of the supporting portions 21 so as to face each other. Each of the inner pad 14 and the outer pad 15 is supported at both its ends by the pad guides 23 so as to be slidable along the axis of the disk. In this state, rotation of the inner pad 14 and the outer pad 15 on an axis parallel to the axis of the disk 13 is restricted. the paragraph The caliper 17 has a housing 24 comprised of a first member 24a and a second member 24b. The housing 24 contains a single electric motor 25 for generating a torque and a decelerating device 27 which decelerates rotation of the motor 25 appropriately and outputs power from an output shaft 26. The motor 25 generates the torque in accordance with instructions from a controller (not shown).

Projecting portions 28 extend in opposite directions from the housing 24 on one side thereof along the axis of the motor 25 (in a lateral direction in FIG. 2).

Each projecting portion 28 of the caliper 17 has a pin 29 fixed thereto. The pin 29 extends in parallel to the axis of the motor 25 in a direction away from the motor 25.

The pins 29 are slidably fitted into the guide bores 20 in the carrier 12. Thus, the caliper 17 containing the motor 25 is slidably supported by the carrier 12.

The output shaft 26 has a small-diameter portion on a side of a distal end portion thereof and a large-diameter portion on a side of a base end portion thereof A first externally threaded portion 31 is formed in an outer circumferential surface of the small-diameter portion, and a second externally threaded portion 32 is formed in an outer circumferential surface of the large-diameter portion. The first externally threaded portion 31 and the second externally threaded portion 32 have equal leads and have a directionally reverse relationship with each other. In the present invention, "have a directionally reverse relationship with each other" with respect to threaded portions means that the threaded portions are adapted to advance in opposite directions relative to the same direction of rotation.

The first externally threaded portion 31 of the output shaft 26, which is formed on a side remote from the motor 25, is engaged with an internally threaded portion 35 formed on one side of a first pad pressing member 34. The other side of the first pad pressing member 34 opposite to the internally threaded portion 35 constitutes a cylindrical portion 36 (as an abutting portion).

The second externally threaded portion 32 of the output shaft 26, which is formed on a side near the motor 25, is engaged with an internally threaded portion 39 formed on a side of a second pad pressing member 38. The second pad pressing member 38 comprises: an internal thread-forming portion 40 having the internally threaded portion 39; a disk pass 41 extending generally vertically from the internal thread-forming portion 40; and a claw portion 42 (as an abutting portion) extending from the disk pass 41 on a side opposite to the internal thread-forming portion 40 in a direction parallel to the internal thread-forming portion 40.

When the caliper 17 is supported by the carrier 12, the motor 25 and the decelerating device 27 are positioned such that their axes are parallel to the axis of the disk 13. Further, in this state, the first pad pressing member 34 is positioned so that the cylindrical portion 36 faces the inner pad 14 on a side opposite to the disk 13 so as to be capable of abutting against the inner pad 14. The second pad pressing member 38 is positioned so that the disk pass 41 extends across an outer periphery of the disk 13, and so that the claw portion 42 faces the outer pad 15 on a side opposite to the disk 13 so as to be capable of abutting against the outer pad 15.

In the first pad pressing member 34 and the inner pad 14, a first rotation restricting portion 44 is provided. The first rotation restricting portion 44 restricts relative rotation between the first pad pressing member 34 and the inner pad 14 while allowing the first pad pressing member 34 and the inner pad 14 to be separated from each other by a predetermined distance along the axis of the disk 13. Thus, the first pad pressing member 34 is restrained from rotating on an axis parallel to the axis of the disk 13.

The first rotation restricting portion 44 comprises, for example, a bore formed in the first pad pressing member 34 so as to extend along the axis of the disk 13 and a shaft extending from the inner pad 14 along the axis of the disk 13 so as to be slidably fitted into the bore in the first pad pressing member 34.

Likewise, in the claw portion 42 of the second pad pressing member 38 and the outer pad 15, a second rotation restricting portion 45 is provided. The second rotation restricting portion 45 restricts relative rotation between the claw portion 42 and the outer pad 15 while allowing the claw portion 42 and the outer pad 15 to be separated from each other by a predetermined distance along the axis of the disk 13. Thus, the second pad pressing member 38 is restrained from rotating on an axis parallel to the axis of the disk 13.

The second rotation restricting portion 45 comprises, for example, a bore formed in the claw portion 42 so as to extend along the axis of the disk 13 and a shaft extending from the outer pad 15 along the axis of the disk 13 so as to be slidably fitted into the bore in the claw portion 42.

In the motor-driven brake system arranged as mentioned above, when the motor 25 is operated in a normal direction, the output shaft 26 of the decelerating device 27 rotates in a normal direction and the first externally threaded portion 31 enables the first pad pressing member 34 including the cylindrical portion 36, which is restrained from rotating by the first rotation restricting portion 44, to move toward the disk 13. On the other hand, simultaneously with the movement of the first pad pressing member 34 toward the disk 13, the second externally threaded portion 32 having a directionally reverse relationship with the first externally threaded portion 31 enables the second pad pressing member 38 to move in a direction for moving the claw portion 42 toward the disk 13, while the second pad pressing member 38 is restrained from rotating by the second rotation restricting portion 45. Consequently, the cylindrical portion 36 and the claw portion 42 press the inner pad 14 and the outer pad 15 toward the disk 13. The inner pad 14 and the outer pad 15 are finally brought into contact with the disk 13, thereby generating a braking force.

In this instance, the caliper 17 is supported by the sliding guide portions 16 so as to be movable along the axis of the disk 13 relative to the carrier 12. Therefore, when run-out of the disk 13 occurs, the caliper 17 moves along the axis of the disk 13, so that the first pad pressing member 34 and the second pad pressing member 38 also move, thus enabling both of the inner pad 14 and the outer pad 15 pressed by the first pad pressing member 34 and the second pad pressing member 38 to follow the run-out of the disk 13. Further, even when the inner pad 14 and the outer pad 15 differ in thickness, the first pad pressing member 34 and the second pad pressing member 38 move satisfactorily to generate and release braking forces.

On the other hand, when the motor 25 is operated in a reverse direction after a braking force has been generated, the output shaft 26 of the decelerating device 27 rotates in a reverse direction and the first externally threaded portion 31 enables the first pad pressing member 34 including the cylindrical portion 36, which is restrained from rotating, to move away from the disk 13. Simultaneously with the movement of the first pad pressing member 34 away from the disk 13, the second externally threaded portion 32 having a directionally reverse relationship with the first externally threaded portion 31 enables the second pad pressing member 38 to move in a direction for moving the claw portion 42 away from the disk 13, while the second pad pressing member 38 is restrained from rotating. Consequently, the inner pad 14 and the outer pad 15 move away from the disk 13 at the same time, thereby releasing the braking force.

As has been described above, in the first embodiment of the present invention, the output shaft 26 rotated by the motor 25 has the first externally threaded portion 31 and the second externally threaded portion 32 which have a directionally reverse relationship with each other. The first externally threaded portion 31 of the output shaft 26 is engaged with the first pad pressing member 34 and the second externally threaded portion 32 of the output shaft 26 is engaged with the second pad pressing member 38. By this arrangement, when the output shaft 26 is rotated in a reverse direction by the motor 25 in order to release a braking force, the first pad pressing member 34 engaged with the first externally threaded portion 31 of the output shaft 26 moves in a direction for moving the cylindrical portion 36 away from the inner pad 14 and at the same time, the second pad pressing member 38 engaged with the second externally threaded portion 32 of the output shaft 26, which threaded portion has a directionally reverse relationship with the first externally threaded portion 31, moves in a direction for moving the claw portion 42 away from the outer pad 15.

Thus, each of the inner pad 14 and the outer pad 15 can be easily moved away from the disk 13, thereby preventing dragging.

Therefore, not only can the lifetime of the outer pad 15 and the disk 13 be extended, but also fuel consumption can be suppressed.

Further, because the caliper 17 as a whole is movable along the axis of the disk 13, when run-out of the disk 13 occurs, the caliper 17 as a whole moves along the axis of the disk 13, so that the first pad pressing member 34 and the second pad pressing member 38 also move, to thereby enable the inner pad 14 and the outer pad 15 pressed by the first pad pressing member 34 and the second pad pressing member 38 to follow the run-out of the disk 13. Consequently, variations in braking force can be suppressed. Further, even when the inner pad 14 and the outer pad 15 differ in thickness, the first pad pressing member 34 and the second pad pressing member 38 move satisfactorily to generate and release braking forces.

In addition, because the first pad pressing member 34 and the second pad pressing member 38 can be moved at the same time, the claw portion 42 and the cylindrical portion 36 can be moved rapidly by a distance equal to the distance between the disk 13 and each pad in an initial period of braking, leading to high responsiveness.

It should be noted that the first externally threaded portion 31 and the internally threaded portion 35, and the second externally threaded portion 32 and the internally threaded portion 39 may have ball screw structures. When ball screw structures are used, reaction forces from the first pad pressing member 34 and the second pad pressing member 38 can be returned to a rotational motion, so that operation of the brake system remains satisfactory even when the thickness of the disk 13 changes.

Further, the lead of the first externally threaded portion 31 and the internally threaded portion 35, and the lead of the second externally threaded portion 32 and the internally threaded portion 39 may be made unequal so as to compensate for the difference in inertia between the first pad pressing member 34 and the second pad pressing member 38. Illustratively stated, the lead of the second externally threaded portion 32 and the internally threaded portion 39 may be greater than that of the first externally threaded portion 31 and the internally threaded portion 35 so that the first pad pressing member 34 and the second pad pressing member 38 can be moved along the axis of the disk 13 by equal distances.

Figure 3:
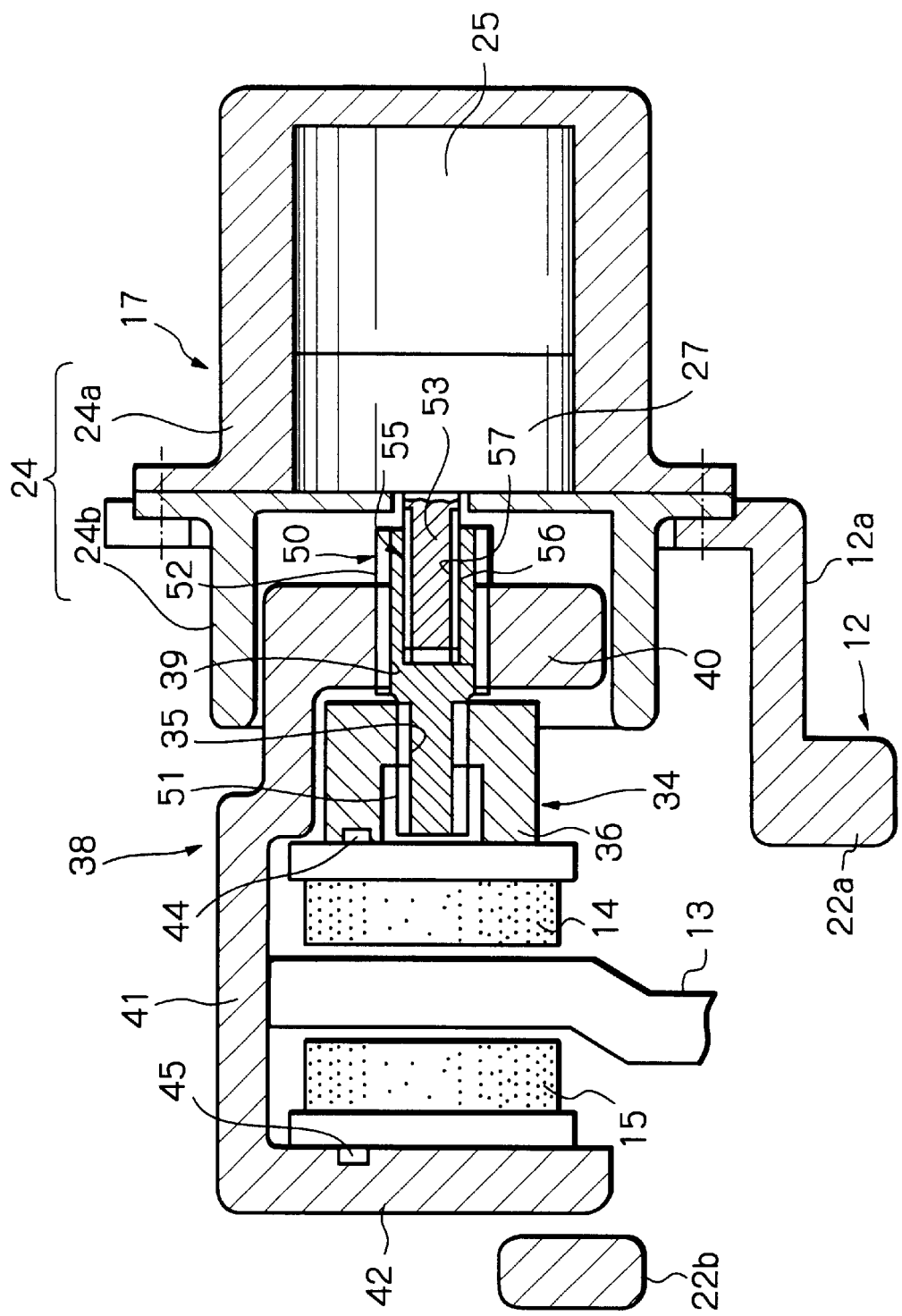
FIG. 3 is a side cross-sectional view of a motor-driven brake system according to a second embodiment of the present invention.
Figure 4:
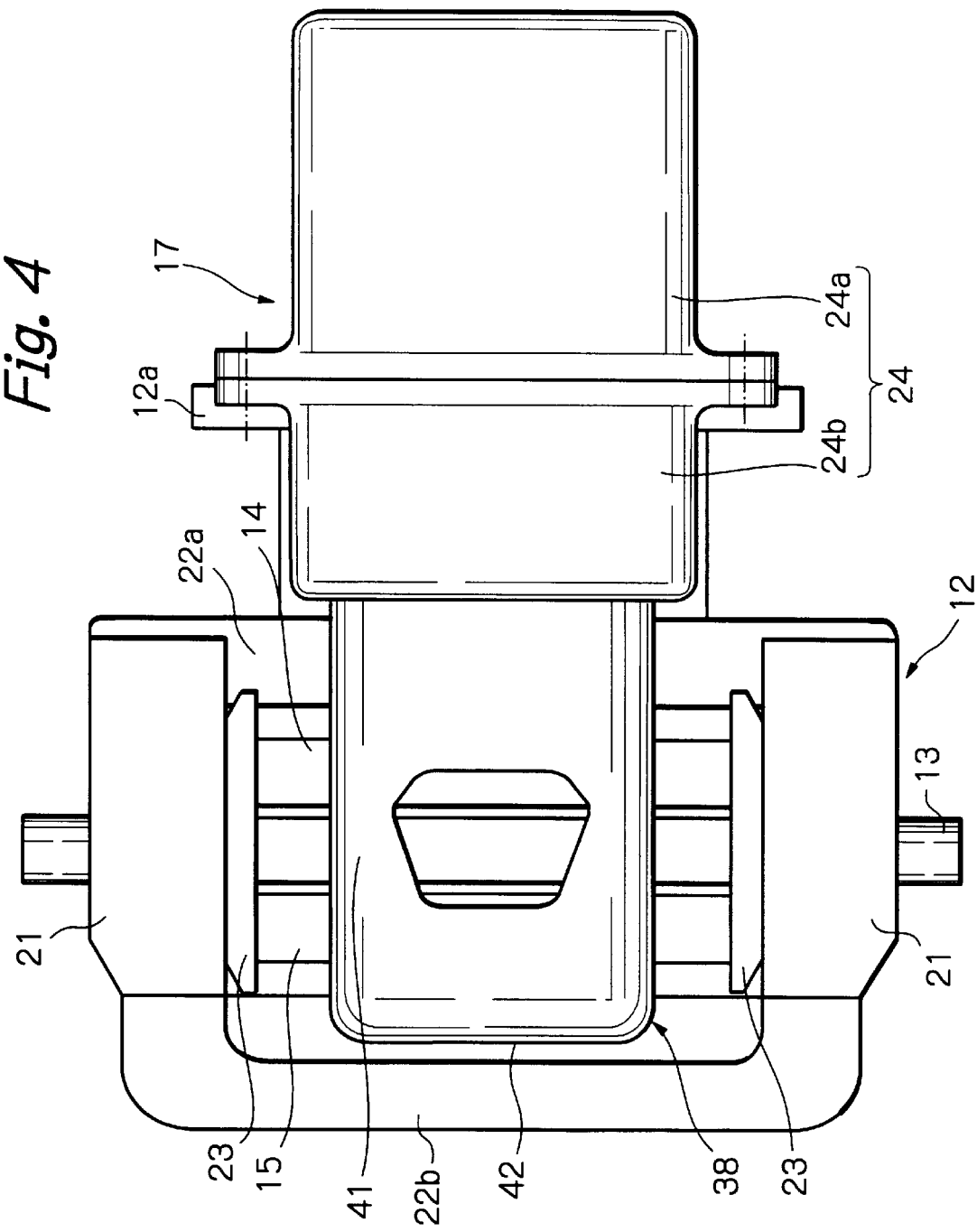
FIG. 4 is a plan view of the motor-driven brake system according to the second embodiment of the present invention.
Figure 5:
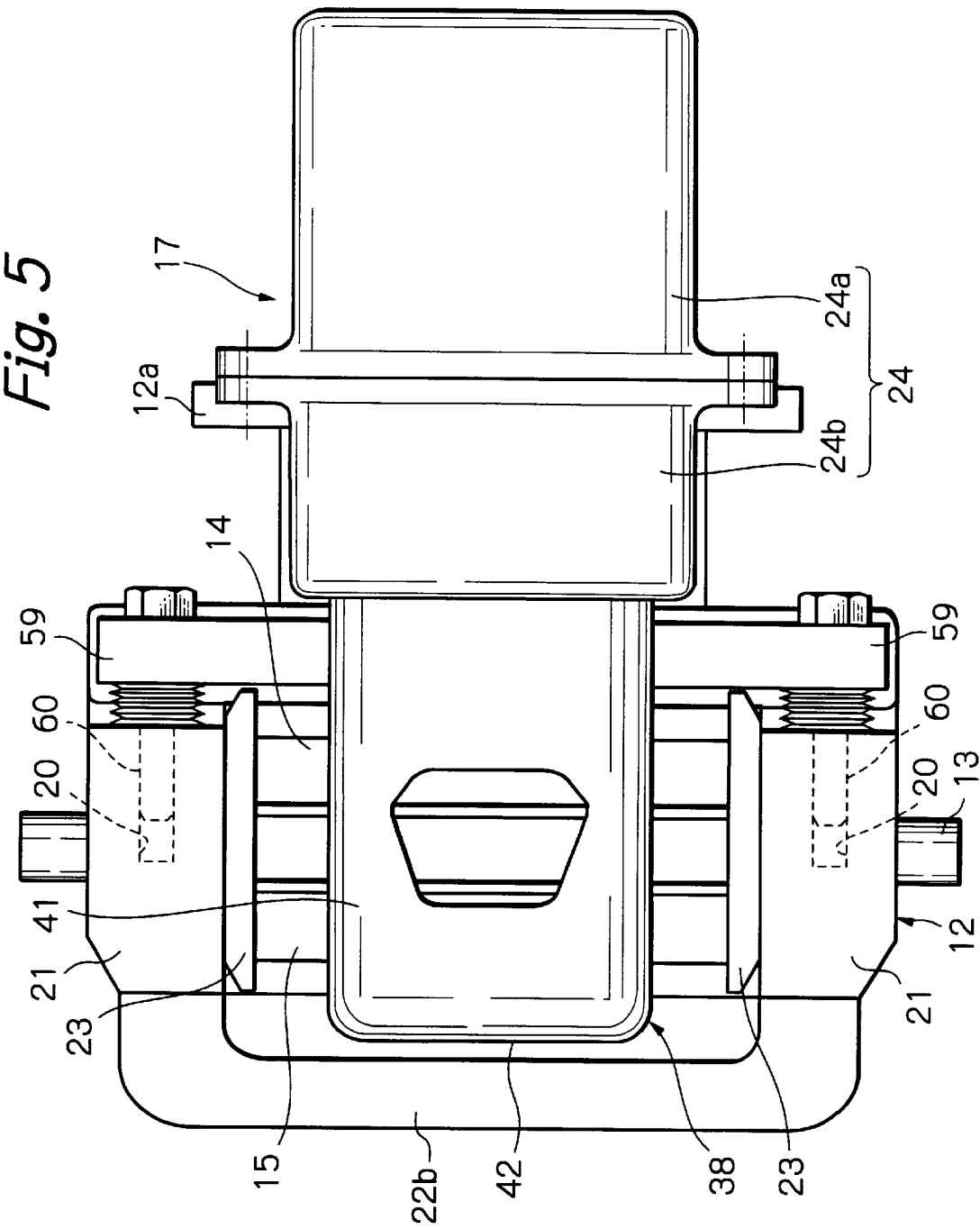
FIG. 5 is a plan view of a modified example of the motor-driven brake system according to the second embodiment of the present invention.

Next, referring to FIGS. 3 and 5, explanation is made on a motor-driven brake system according to a second embodiment of the present invention. In the following description, mainly those portions in which the second embodiment differs from the first embodiment are described in detail. The same members or portions as those in the first embodiment are denoted by the same reference numerals, and explanations thereof are omitted.

In the motor-driven brake system in the second embodiment, a rotation transmitting member 50 is provided.

The rotation transmitting member 50 has a small-diameter portion on a side of a distal end portion thereof and a large-diameter portion on a side of a base end portion thereof. A first externally threaded portion 51 is formed in an outer circumferential surface of the small-diameter portion and a second externally threaded portion 52 is formed in an outer circumferential surface of the large-diameter portion. The first externally threaded portion 51 and the second externally threaded portion 52 have equal leads and have a directionally reverse relationship with each other.

The first externally threaded portion 51 is threadably engaged with the internally threaded portion 35 of the first pad pressing member 34 which is the same as that in the first embodiment, and the second externally threaded portion 52 is threadably engaged with the internally threaded portion 39 of the second pad pressing member 38 which is the same as that in the first embodiment.

Further, in the second embodiment, the decelerating device 27 has an output shaft 53 differing from the output shaft 26 in the first embodiment. The output shaft 53 and the rotation transmitting member 50 are connected through a sliding mechanism portion 55 which permits axial movement of the rotation transmitting member 50 relative to the output shaft 53 while restricting relative rotation therebetween.

The sliding mechanism portion 55 comprises a splined shaft 56 formed in the output shaft 53 of the decelerating device 27 and a splined bore 57 formed in the rotation transmitting member 50 on a side of the second externally threaded portion 52 so that the splined shaft 56 is slidably fitted into the splined bore 57.

The carrier 12 fixed on the non-rotatable portion of the vehicle body has a connecting portion 12a for fixedly connecting the housing 24 of the caliper 17 and the carrier 12 as a unit. Thus, the housing 24, the motor 25 and the decelerating device 27 are fixedly positioned relative to the carrier 12. It should be noted that the caliper 17 may not necessarily be fixed to the carrier 12 and may be fixed directly to the non-rotatable portion of the vehicle body.

On the other hand, the rotation transmitting member 50 is disposed so as to be movable along the axis of the disk 13 in the above-mentioned manner.

In the motor-driven brake system arranged as mentioned above, when the motor 25 is operated in a normal direction, the output shaft 53 of the decelerating device 27 rotates in a normal direction, so that the rotation transmitting member 50 connected to the output shaft 53 through the sliding mechanism portion 55 also rotates in a normal direction. Consequently, the first externally threaded portion 51 enables the first pad pressing member 34 including the cylindrical portion 36, which is restrained from rotating by the first rotation restricting portion 44, to move toward the disk 13. On the other hand, simultaneously with the movement of the first pad pressing member 34 toward the disk 13, the second externally threaded portion 52 having a directionally reverse relationship with the first externally threaded portion 51 enables the second pad pressing member 38 to move in a direction for moving the claw portion 42 toward the disk 13, while the second pad pressing member 38 is restrained from rotating by the second rotation restricting portion 45. Thus, the cylindrical portion 36 and the claw portion 42 press the inner pad 14 and the outer pad 15 toward the disk 13. The inner pad 14 and the outer pad 15 are finally brought into contact with the disk 13, thereby generating a braking force.

In this instance, the rotation transmitting member 50 is supported by the sliding mechanism portion 55 so as to be movable along the axis of the disk 13 relative to the output shaft 53 of the decelerating device 27. Therefore, when run-out of the disk 13 occurs, the rotation transmitting member 50 moves along the axis of the disk 13, so that the first pad pressing member 34 and the second pad pressing member 38 threadably engaged with the rotation transmitting member 50 also move, thus enabling both of the inner pad 14 and the outer pad 15 pressed by the first pad pressing member 34 and the second pad pressing member 38 to follow the run-out of the disk 13. Further, even when the inner pad 14 and the outer pad 15 differ in thickness, the first pad pressing member 34 and the second pad pressing member 38 move satisfactorily to generate and release braking forces.

On the other hand, when the motor 25 is operated in a reverse direction after a braking force has been generated, the output shaft 53 of the decelerating device 27 rotates in a reverse direction, so that the rotation transmitting member 50 connected to the output shaft 53 through the sliding mechanism portion 55 also rotates in a reverse direction. Consequently, the first externally threaded portion 51 enables the first pad pressing member 34 including the cylindrical portion 36, which is restrained from rotating, to move away from the disk 13. Simultaneously with the movement of the first pad pressing member 34 away from the disk 13, the second externally threaded portion 52 having a directionally reverse relationship with the first externally threaded portion 51 enables the second pad pressing member 38 to move in a direction for moving the claw portion 42 away from the disk 13, while the second pad pressing member 38 is restrained from rotating. Therefore, the inner pad 14 and the outer pad 15 move away from the disk 13 at the same time, thereby releasing the braking force.

The above-mentioned arrangement in the second embodiment provides the same advantageous effects as those of the first embodiment. Moreover, because the rotation transmitting member 50 is movable along the axis of the disk 13 through the sliding mechanism portion 55, the brake system can be arranged so that the housing 24 containing the motor 25 and the decelerating device 27 is fixed to the carrier 12 and only the rotation transmitting member 50, the first pad pressing member 34 and the second pad pressing member 38 are moved along the axis of the disk 13. Therefore, the weight of the member to be moved can be reduced, thereby suppressing a resistance to sliding movement and thus improving initial responsivity of the brake system. In addition, when run-out of the disk 13 occurs, the inner pad 14 and the outer pad 15 smoothly follow the run-out of the disk 13. Further, a load applied to the portion supporting the member to be moved can be suppressed.

It should be noted that in the second embodiment, the sliding guide portions 16 for permitting sliding movement of the caliper 17 relative to the carrier 12 are unnecessary. As shown in FIG. 5, projecting portions 59 extend in opposite directions from both sides of the second pad pressing member 38. Each projecting portion 59 has a pin 60 fixed thereto. The pin 60 extends in parallel to the axis of the disk 13 in a direction of the claw portion 42. The pins 60 are slidably fitted into the guide bores 20 in the carrier 12. By this arrangement, the restriction of rotation of the second pad pressing member 38 can be strengthened or the second rotation restricting portion 45 becomes unnecessary.

Figure 6:
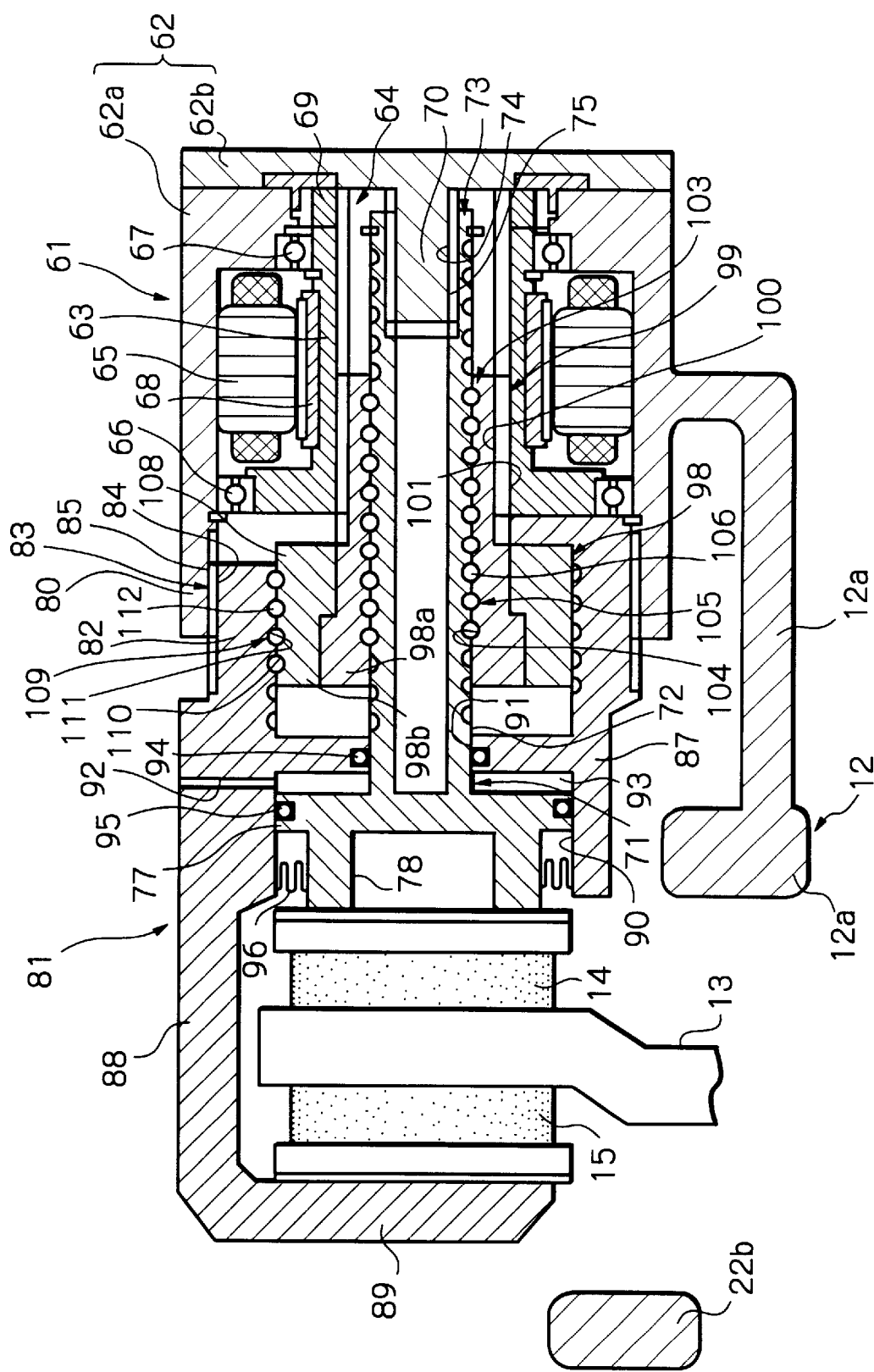
FIG. 6 is a side cross-sectional view of a motor-driven brake system according to a third embodiment of the present invention.
Figure 7:
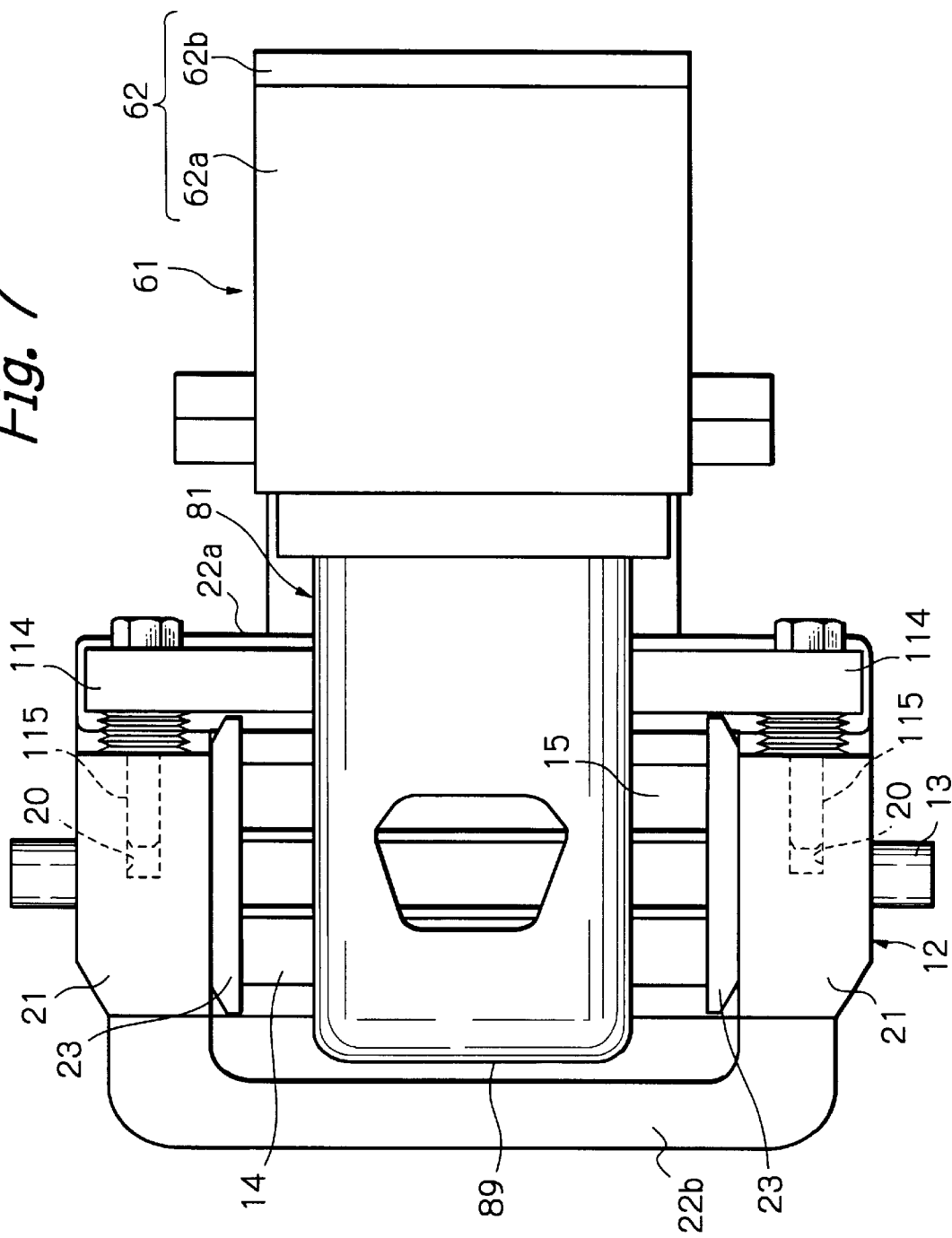
FIG. 7 is a plan view of a modified example of the motor-driven brake system according to the third embodiment of the present invention.

Next, referring to FIGS. 6 and 7, explanation is made on a motor-driven brake system according to a third embodiment of the present invention. In the following description, mainly those portions in which the third embodiment differs from the first embodiment are described in detail. The same members or portions as those in the first embodiment are denoted by the same reference numerals and explanations thereof are omitted.

In the third embodiment, a caliper 61 comprises a housing 62 composed of a generally cylindrical first member 62a and a second member 62b closing one end of the first member 62a. The housing 62 constitutes a part of a motor 64 which rotates a cylindrical output member 63.

The motor 64 comprises: the housing 62; a coil 65 attached to an inner circumferential surface of the housing 62; bearings 66 and 67 arranged at opposite sides of the coil 65; the output member 63 rotatably supported in the housing 62 with the bearings 66 and 67 being provided therebetween; and a magnet 68 fixed to an outer circumferential surface of the output member 63 within the coil 65. A position detector 69 for detecting a rotated position of the output member 63 is provided between the bearing 67 and the second member 62b. The motor 64 generates a torque in accordance with instructions from a controller (not shown).

The second member 62b of the housing 62 has a projecting shaft portion 70 which extends coaxially within the first member 62a while a gap is provided between the projecting shaft portion 70 and an inner circumferential surface of the output member 63.

The carrier 12 fixed to the non-rotatable portion of the vehicle body has the connecting portion 12a for connecting the carrier 12 and the housing 62 as a unit. Thus, the motor 64 including the housing 62 is fixedly positioned relative to the carrier 12. The caliper 61 may not necessarily be fixed to the carrier 12 and may be fixed directly to the non-rotatable portion of the vehicle body.

The projecting shaft portion 70 of the housing 62 is fitted into a cylindrical portion 72 formed on one side of a first pad pressing member 71 with a first sliding mechanism portion 73 being provided therebetween. The first sliding mechanism portion 73 permits axial movement of the cylindrical portion 72 relative to the projecting shaft portion 70 while restricting relative rotation therebetween.

The first sliding mechanism portion 73 comprises a splined bore 74 formed in the cylindrical portion 72 and a splined shaft 75 formed in the projecting shaft portion 70 so as to be slidably-fitted into the splined bore 74.

A circular plate portion 77 having a larger diameter than the cylindrical portion 72 is formed in the cylindrical portion 72 on a side thereof opposite to the splined bore 74 to be coaxial therewith. A cylindrical portion 78 having a smaller diameter than the circular plate portion 77 is formed in the circular plate portion 77 on a side thereof opposite to the cylindrical portion 72 to be coaxial therewith.

The first member 62a of the housing 62 has a cylindrical projecting portion 80 extending toward the carrier 12 relative to the bearing 66. A cylindrical portion 82 is formed on one side of a second pad pressing member 81 which is fitted into the cylindrical projecting portion 80 with a second sliding mechanism portion 83 being provided therebetween. The second sliding mechanism portion 83 permits axial movement of the cylindrical portion 82 relative to the cylindrical projecting portion 80 while restricting relative rotation therebetween.

The second sliding mechanism portion 83 comprises a splined bore 84 formed in the cylindrical projecting portion 80 and a splined shaft 85 formed in the cylindrical portion 82 so as to be slidably fitted into the splined bore 84.

The second pad pressing member 81 comprises: the cylindrical portion 82; a bottom portion 87 formed on one end of the cylindrical portion 82; a disk pass 88 extending from the bottom portion 87 on a side opposite to the cylindrical portion 82 in a direction parallel to the axis of the cylindrical portion 82; and a claw portion 89 extending from the disk pass 88 on a side opposite to the bottom portion 87 in a direction parallel to the bottom portion 87.

The bottom portion 87 has a recessed portion 90 formed on a side thereof opposite to the cylindrical portion 82 in a coaxial relationship with the cylindrical portion 82. Further, the bottom portion 87 has a through-bored portion 91 extending from the side of the cylindrical portion 82 to the recessed portion 90 in a coaxial relationship with the recessed portion 90.

The first pad pressing member 71 is supported by the second pad pressing member 81, such that the cylindrical portion 72 and the circular plate portion 77 are slidably fitted into the through-bored portion 91 and the recessed portion 90, respectively. The second pad pressing member 81 has a port 92 communicated with a chamber 93 defined by the first pad pressing member 71 and the bottom portion 87 of the second pad pressing member 81.

A sealing member 94 is provided so as to seal a gap between an inner circumferential surface of the through-bored portion 91 and an outer circumferential surface of the cylindrical portion 72 and a sealing member 95 is provided so as to seal a gap between an outer circumferential surface of the circular plate portion 77 and an inner circumferential surface of the recessed portion 90.

Further, a dust boot 96 is provided between an outer circumferential surface of the cylindrical portion 78 and the inner circumferential surface of the recessed portion 90 so as to prevent entry of dust into the portion where the first pad pressing member 71 and the second pad pressing member 81 are slidably moved.

A stepped cylindrical rotation transmitting member 98 is provided within the output member 63 of the motor 64.

The output member 63 and the rotation transmitting member 98 are connected through a sliding mechanism portion 99 which permits slidable movement of the rotation transmitting member 98 relative to the output member 63 while restricting relative rotation therebetween. The sliding mechanism portion 99 comprises a splined bore 100 formed in the output member 63 and a splined shaft 101 formed on one side of the rotation transmitting member 98 along the axis thereof so as to be slidably fitted into the splined bore 100.

The first pad pressing member 71 is provided within the rotation transmitting member 98 with a first ball screw 103 being provided therebetween. Illustratively stated, an internally threaded portion 104 is formed in an inner circumferential surface of the rotation transmitting member 98 and an externally threaded portion 105 is formed in an outer circumferential surface of the cylindrical portion 72 of the first pad pressing member 71. Balls 106 are provided between the internally threaded portion 104 and the externally threaded portion 105.

The other side of the rotation transmitting member 98 along the axis thereof constitutes a large-diameter portion 108 having a larger diameter than the splined shaft 101. The second pad pressing member 81 is fitted onto the large-diameter portion 108 with a second ball screw 109 being provided therebetween. Illustratively stated, an externally threaded portion 110 is formed in an outer circumferential surface of the large-diameter portion 108 and an internally threaded portion 111 is formed in an inner circumferential surface of the cylindrical portion 82 of the second pad pressing member 81. Balls 112 are provided between the externally threaded portion 110 and the internally threaded portion 111.

It should be noted that the first ball screw 103 and the second ball screw 109 have equal leads and have a directionally reverse relationship with each other.

The rotation transmitting member 98 is formed by fixedly fitting a first member 98a having the internally threaded portion 104 and the splined shaft 75 into a second member 98b having the externally threaded portion 110.

The first pad pressing member 71 is positioned so that the cylindrical portion 78 faces the inner pad 14 on a side opposite the disk 13 so as to be capable of abutting against the inner pad 14. The second pad pressing member 81 is positioned so that the disk pass 88 extends across the outer periphery of the disk 13, and so that the claw portion 89 faces the outer pad 15 on a side opposite to the disk 13 so as to be capable of abutting against the outer pad 15.

In the motor-driven brake system arranged as mentioned above, when the motor 64 rotates the output member 63 in a normal direction, the rotation transmitting member 98 connected to the output member 63 through the sliding mechanism portion 99 also rotates in a normal direction. Consequently, the first ball screw 103 enables the first pad pressing member 71 including the cylindrical portion 78, which is restrained from rotating by the first sliding mechanism portion 73, to move toward the disk 13. On the other hand, simultaneously with the movement of the first pad pressing member 71 toward the disk 13, the second ball screw 109 having a directionally reverse relationship with the first ball screw 103 enables the second pad pressing member 81 to move in a direction for moving the claw portion 89 toward the disk 13, while the second pad pressing member 81 is restrained from rotating by the second sliding mechanism portion 83. Thus, the cylindrical portion 78 of the first pad pressing member 71 and the claw portion 89 of the second pad pressing member 81 press the inner pad 14 and the outer pad 15 toward the disk 13. The inner pad 14 and the outer pad 15 are finally brought into contact with the disk 13, thereby generating a braking force.

In this instance, the rotation transmitting member 98 is supported by the sliding mechanism portion 99 so as to be movable along the axis of the disk 13 relative to the output member 63 of the motor 64. Therefore, when run-out of the disk 13 occurs, the rotation transmitting member 98 moves along the axis of the disk 13, so that the first pad pressing member 71 and the second pad pressing member 81 threadably engaged with the rotation transmitting member 98 also move, thus enabling both of the inner pad 14 and the outer pad 15 pressed by the first pad pressing member 71 and the second pad pressing member 81 to follow the run-out of the disk 13.

On the other hand, when the motor 64 rotates the output member 63 of the motor 64 in a reverse direction after a braking force has been generated, the rotation transmitting member 98 connected to the output member 63 through the sliding mechanism portion 99 also rotates in a reverse direction. Consequently, the first ball screw 103 enables the first pad pressing member 71 including the cylindrical portion 78, which is restrained from rotating, to move away from the disk 13. Simultaneously with the movement of the first pad pressing member 71 away from the disk 13, the second ball screw 109 having a directionally reverse relationship with the first ball screw 103 enables the second pad pressing member 81 to move in a direction for moving the claw portion 89 away from the disk 13, while the second pad pressing member 81 is restrained from rotating. Therefore, the inner pad 14 and the outer pad 15 move away from the disk 13 at the same time, thereby releasing the braking force.

The above-mentioned arrangement in the third embodiment provides the same advantageous effects as those of the first and second embodiments. Moreover, because the rotation transmitting member 98 has the first ball screw 103 at the inner circumferential surface thereof and the second ball screw 109 at the outer circumferential surface thereof, the axial length of the rotation transmitting member 98 is small, as compared to the rotation transmitting member having both the first ball screw 103 and the second ball screw 109 arranged laterally at the outer circumferential surface thereof.

Further, because the first ball screw 103 and the second ball screw 109 are used, it is possible to return reaction forces from the first pad pressing member 71 and the second pad pressing member 81 to a rotational motion, so that operation of the brake system remains satisfactory even when the thickness of the disk 13 changes.

Further, because the first ball screw 103 and the second ball screw 109 are used, it is possible to operate the brake system under hydraulic pressure, by applying a hydraulic pressure from a master cylinder through the port 92 to the chamber 93 between the first pad pressing member 71 and the second pad pressing member 81. Therefore, it becomes possible to operate the brake system by utilizing both hydraulic pressure and the motor 64. That is, it is possible to use the motor 64 to assist the hydraulic pressure during normal braking so that a braking force can be surely generated by utilizing the hydraulic pressure even when the motor 64 fails to operate.

In addition, because the rotation transmitting member 98 and the output member 63 of the motor 64 are connected through the sliding mechanism portion 99, it is possible to prevent transmission of heat generated on a side of the inner pad 14 and the outer pad 15 to the motor 64 during braking.

It should be noted that in the third embodiment, the sliding guide portions 16 for permitting sliding movement of the caliper 61 relative to the carrier 12 are unnecessary. As shown in FIG. 7, projecting portions 114 extend in opposite directions from both sides of the second pad pressing member 81. Each projecting portion 114 has a pin 115 fixed thereto. The pin 115 extends in parallel to the axis of the disk 13 in a direction of the claw portion 89. The pins 115 are slidably fitted into the guide bores 20 in the carrier 12. By this arrangement, the restriction of rotation of the second pad pressing member 81 can be strengthened or the second sliding mechanism portion 83 becomes unnecessary.

Further, the lead of the first ball screw 103 and the lead of the second ball screw 109 may be made unequal so as to compensate for the difference in inertia between the first pad pressing member 71 and the second pad pressing member 81. Illustratively stated, the lead of the second ball screw 109 may be greater than that of the first ball screw 103 so that the first pad pressing member 71 and the second pad pressing member 81 can be moved along the axis of the disk 13 by equal distances.

In the motor-driven brake system, there is provided a converting device which is rotated by an electric motor and which has a first threaded portion and a second threaded portion having a directionally reverse relationship with each other. The first threaded portion of the converting device is threadably engaged with first pad pressing member and the second threaded portion of the converting device is engaged with second pad pressing member. By this arrangement, when the converting device is rotated in a predetermined direction by the electric motor in order to release a braking force, the first pad pressing member and the second pad pressing member move in opposite directions. Therefore, each of the pads which have been pressed by the first and second pad pressing members can be easily moved away from the disk, to thereby prevent dragging. Consequently, the lifetime of the pads and the disk can be extended and fuel consumption can be suppressed.

Further, because the caliper is made movable along the axis of the disk, when run-out of the disk occurs, the caliper moves along the axis of the disk, so that the first and second pad pressing members also move, thus enabling both of the pads pressed by the pad pressing members to follow the run-out of the disk. Consequently, variations in braking force can be suppressed. Further, even when the pads differ in thickness, the first pad pressing member and the second pad pressing member move satisfactorily to generate and release braking forces.

In the motor-driven brake system, the rotation transmitting member is movable along the axis of the disk, so that it is unnecessary to move the caliper as a whole along the axis of the disk. Therefore, the weight of the member to be moved can be reduced, thereby suppressing a resistance to sliding movement and thus improving initial responsivity of the brake system. In addition, when run-out of the disk occurs, the pads smoothly follow the run-out of the disk. Further, a load applied to the portion supporting the member to be moved can be suppressed.

In the motor-driven brake system, the rotation transmitting member has a first ball screw at an inner circumferential surface thereof and a second ball screw at an outer circumferential surface thereof, so that the axial length of the rotation transmitting member is small, as compared to the rotation transmitting member having both of the first ball screw and the second ball screw arranged laterally at the outer circumferential surface thereof.

Next, explanation is made below on a motor-driven brake system according to a fourth embodiment of the present invention, with reference to FIGS. 8 to 15(D).

Figure 8:
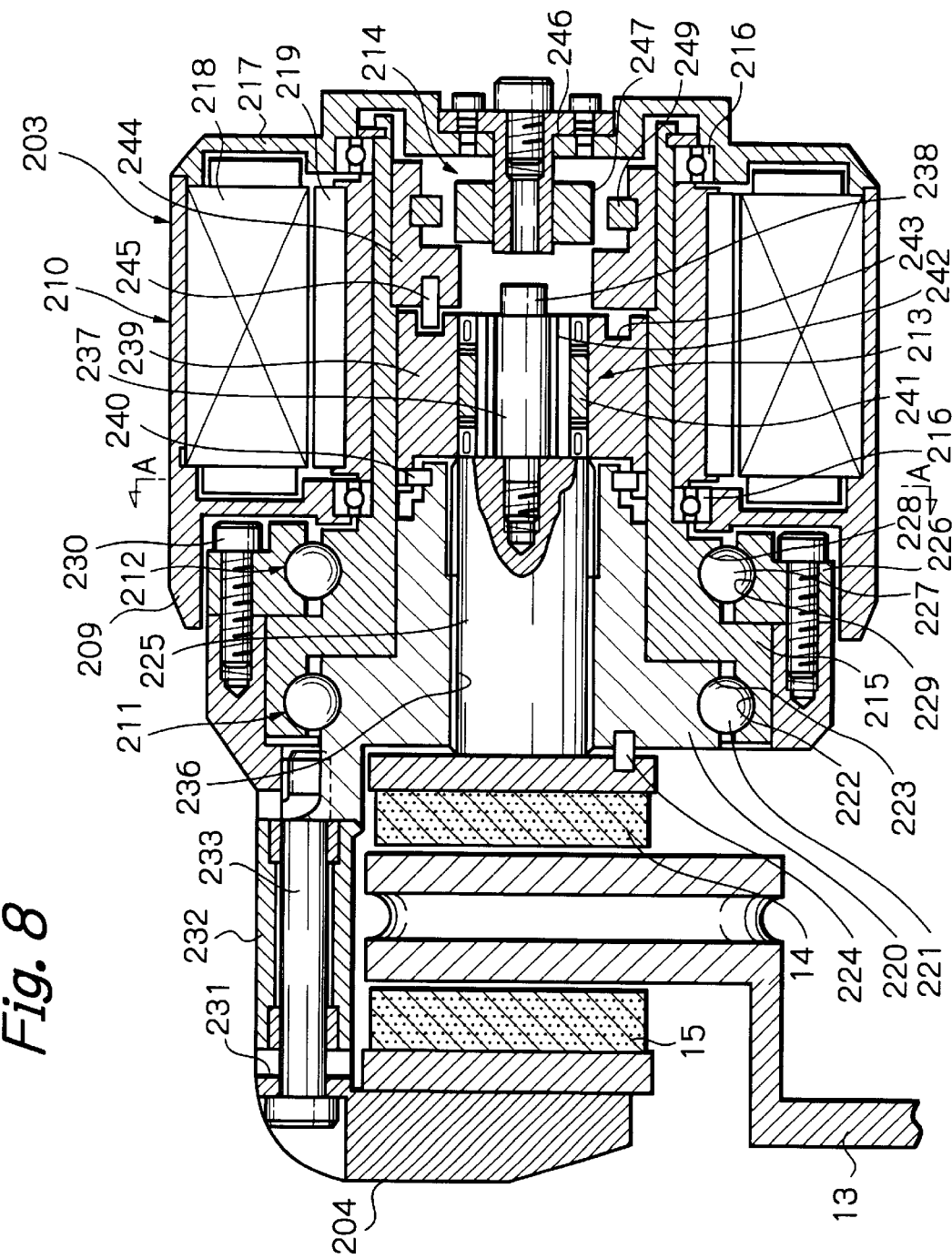
FIG. 8 is a vertical cross-sectional view of a motor-driven brake system according to a fourth embodiment of the present invention.
Figure 9:
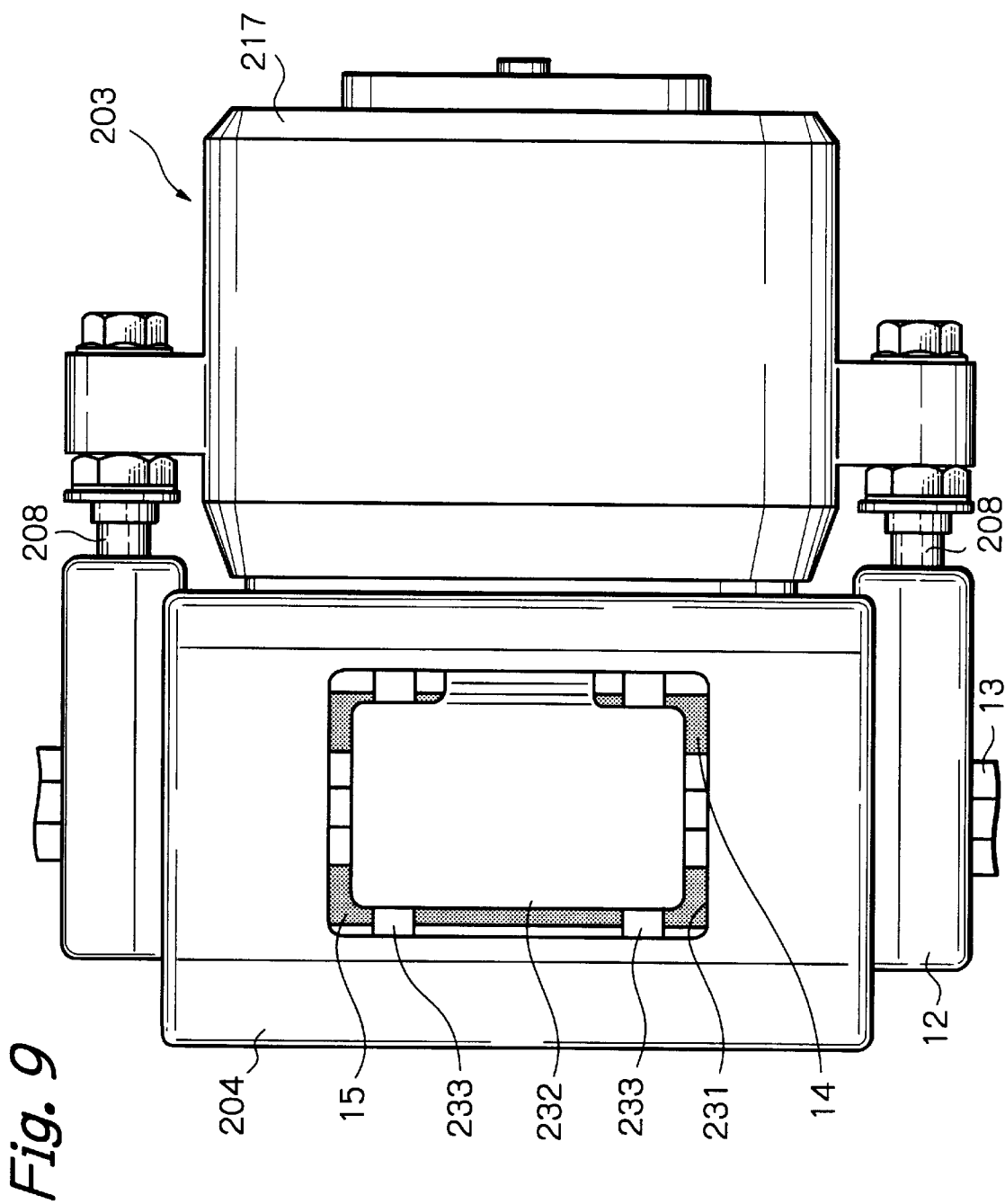
FIG. 9 is a plan view of the motor-driven brake system of FIG. 8.
Figure 10:
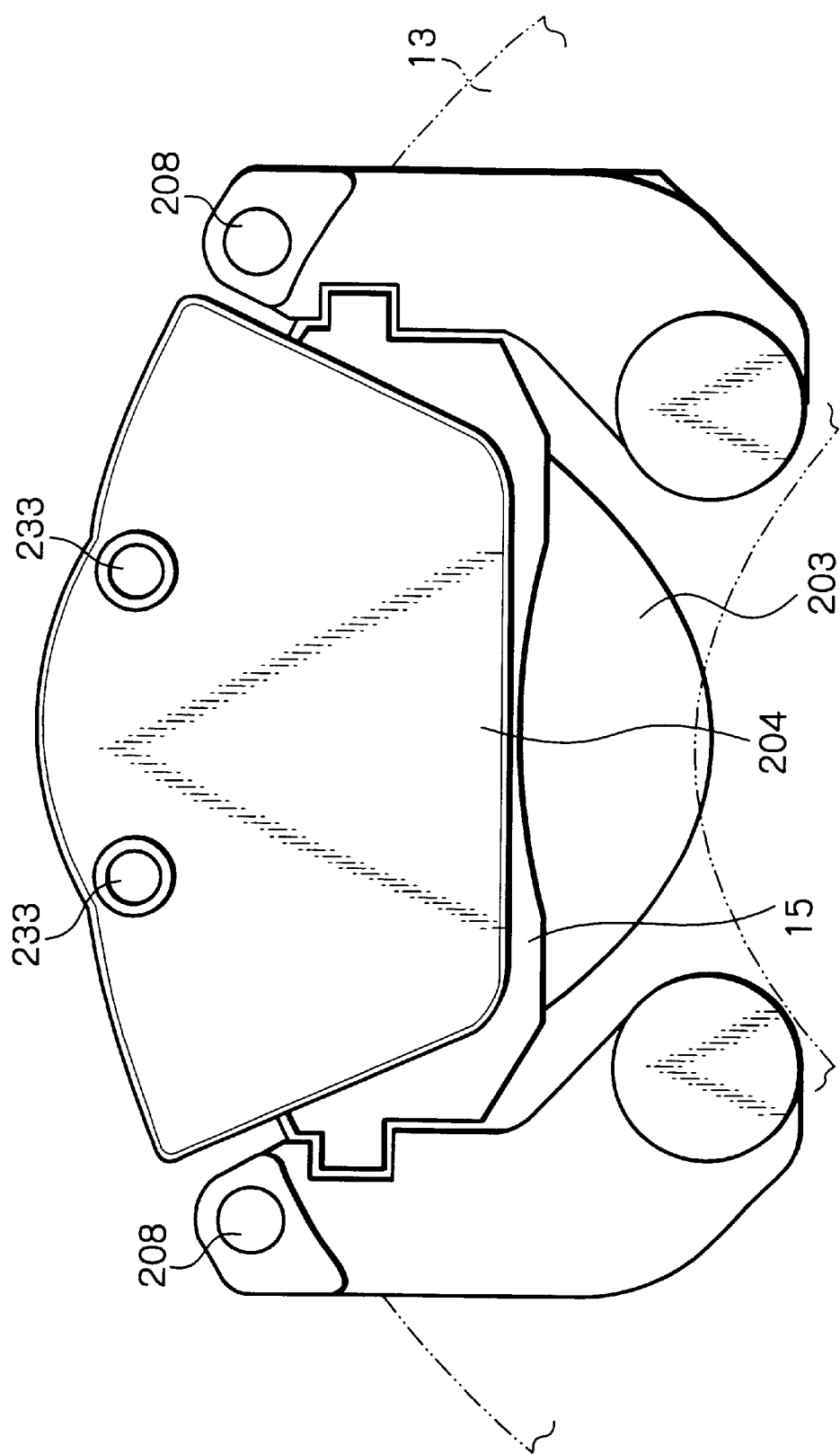
FIG. 10 is a side view of the motor-driven brake system of FIG. 8.

Referring to FIGS. 8 to 10, in the motor-driven brake system in this embodiment, a caliper body 203 is disposed at one side of the disk 13 (generally inwardly relative to the vehicle body) which rotates with a vehicle wheel. A claw portion 204 extends from the caliper body 203 across the disk 13. The inner pad 14 and the outer pad 15 are disposed at opposite sides of the disk 13, that is, between the disk 13 and the caliper body 203 and between the disk 13 and the claw portion 204, respectively. The inner and outer pads 14 and 15 are supported by the carrier 12 fixed to the vehicle body, so as to be movable along the axis of the disk 13. The caliper body 203 is guided by the carrier 12 through slide pins 208, so as to be movable along the axis of the disk 13.

The caliper body 203 comprises a generally cylindrical housing 209 in which a single electric motor 210, a first ball screw mechanism 211, a second ball screw mechanism 212, a pad wear compensating mechanism 213 and a rotation detector 214 (e.g., a resolver) are provided. Further, a stepped cylindrical rotor member 215 having a large-diameter portion and a small-diameter portion is rotatably supported in the housing 209 with ball bearings 216 being provided therebetween. A cover 217 is attached to a rear end portion of the housing 209.

The motor 210 comprises a stator 218 fixed to an inner circumferential surface of the housing 209 and a rotor magnet 219 attached to an outer circumferential surface of the rotor member 215 so as to face an inner circumferential surface of the stator 218. The motor 210 rotates the rotor member 215 by a desired angle by generating a desired torque in response to a control signal (an electric signal) from a controller (not shown).

The first ball screw mechanism 211 comprises: the rotor member 215; a stepped cylindrical inner body (first pressing member) 220 having a large-diameter portion and a small-diameter portion, which body is fitted into the rotor member 215 for relative rotational and axial movements therebetween; and a plurality of balls (steel balls) 221 provided between the rotor member 215 and the inner body 220. A thread groove 222 and a thread groove 223 are formed in an inner circumferential surface of the large-diameter portion of the rotor member 215 and an outer circumferential surface of the large-diameter portion of the inner body 220, respectively, so as to face each other and extend in parallel to each other at a predetermined angle relative to the circumferential direction of the rotor member 215 and the inner body 220. The balls 221 are held between these thread grooves 222 and 223. A back plate of the inner pad 14 and the inner body 220 accommodate a pin 224 which restricts rotation thereof.

The thread groove 222 and the thread groove 223 constitute a left-hand threaded portion. When the rotor member 215 rotates in a clockwise direction from its original position, the balls 221 roll in a space formed by the thread groove 222 and the thread groove 223, so that the inner body 220 moves toward the left as viewed in FIG. 8, to thereby enable a piston 225 (described later) attached to the inner body 220 to press the inner pad 14 against the disk 13. In this embodiment, "clockwise direction" means the clockwise direction as viewed from the right side of FIG. 8.

The second ball screw mechanism 212 comprises: the rotor member 215; a generally cylindrical outer body (second pad pressing member) 226 which is fitted onto the rotor member 215 for relative rotational and axial movements therebetween; and a plurality of balls (steel balls) 227 provided between the rotor member 215 and the outer body 226. A thread groove 228 and a thread groove 229 are formed in an outer circumferential surface of the small-diameter portion of the rotor member 215 and an inner circumferential surface of the outer body 226, respectively, so as to face each other and extend in parallel to each other at a predetermined angle relative to the circumferential direction of the rotor member 215 and the outer body 226.

The balls 227 are held between these thread grooves 228 and 229. The claw portion 204 is connected to the outer body 226 by a bolt 230. At the outer periphery of the disk 13, a guide portion 232 extending from the inner body 220 is inserted in an opening 231 formed in the claw portion 204. A pair of slide pins 233 threadably engaged with the claw portion 204 are slidably inserted in the guide portion 232. Thus, the inner body 220, the claw portion 204 and the outer body 226 are guided so as to be movable relative to each other along the axis of the disk 13, while relative rotation between the inner body 220, the claw portion 204 and the outer body 226 is restricted.

The thread groove 228 and the thread groove 229 constitute a right-hand threaded portion. When the rotor member 215 rotates in the clockwise direction from its original position, the balls 227 roll in a space formed by the thread groove 228 and the thread groove 229, so that the outer body 226 moves toward the right as viewed in FIG. 8, to thereby enable the claw portion 204 to press the outer pad 15 against the disk 13.

Figure 11:
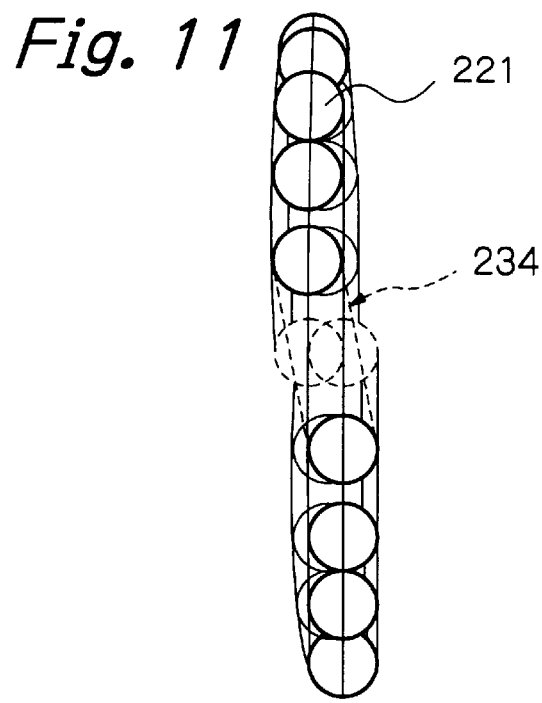
FIG. 11 is a side view, showing how balls of a first ball screw mechanism of the motor-driven brake system of FIG. 8 are arranged.
Figure 12:
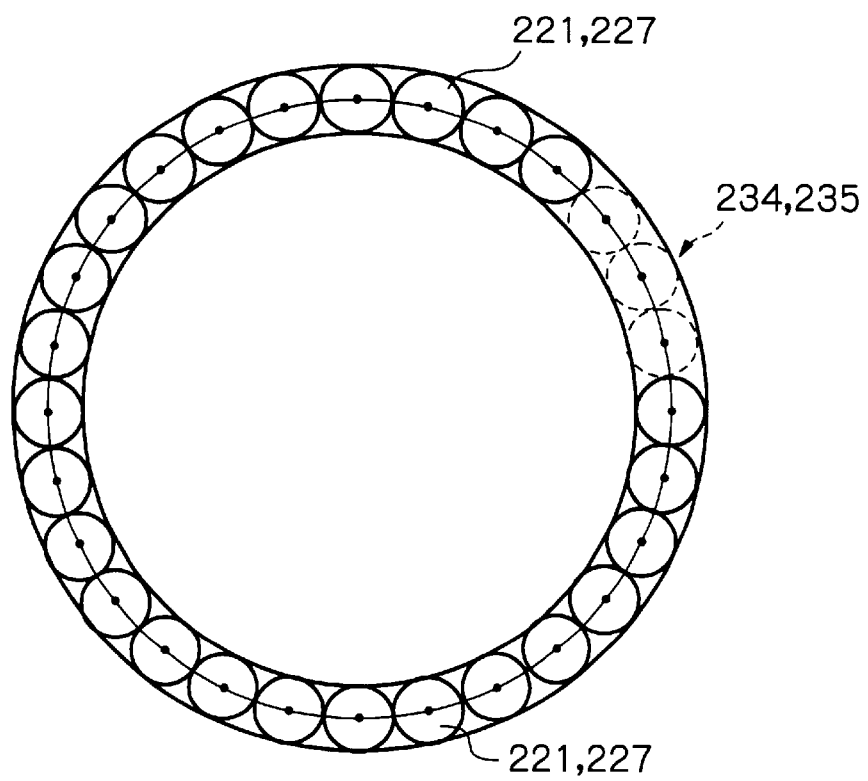
FIG. 12 is a front view, showing how balls of the first and second ball screw mechanisms of the motor-driven brake system of FIG. 8 are arranged.
Figure 13:
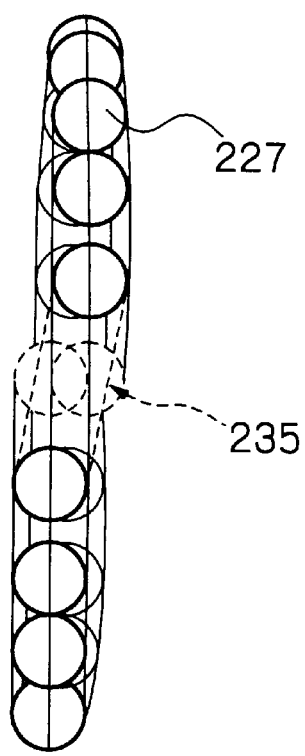
FIG. 13 is a side view, showing how balls of the second ball screw mechanism of the motor-driven brake system of FIG. 8 are arranged.

As shown in FIGS. 11 to 13, the thread grooves 222 and 223 of the first ball screw mechanism 211, and the thread grooves 228 and 229 of the second ball screw mechanism 212 are formed in the rotor member 215 and the inner body 220, and the rotor member 215 and the outer body 226, so as not to extend completely around the peripheries thereof. That is, the thread grooves 222 and 223, and the thread grooves 228 and 229 have a length of less than 1 pitch. Therefore, the thread grooves 222 and 223, and the thread grooves 228 and 229 can be formed at a small angle relative to the circumferential direction, regardless of the diameters of the balls 221 and 227. Further, the lead of each of the first ball screw mechanism 211 and the second ball screw mechanism 212 can be determined as a satisfactorily small value, which is impossible in a conventional ball screw mechanism due to interference between balls.

Because each of the rotor member 215 and the inner body 220 is formed into a stepped cylindrical body, it is possible to arrange the first ball screw mechanism 211 and the second ball screw mechanism 212 so that the space formed by the thread grooves 222 and 223 and the space formed by the thread grooves 228 and 229 are equal in diameter, and so that the angle of the thread grooves 222 and 223 and the angle of the thread grooves 228 and 229 relative to the circumferential direction are equal. Therefore, the inner pad 14 and the outer pad 15 can be moved toward the disk 13 by equal distances. Further, as indicated by broken lines in FIGS. 11 to 13, both ends of the thread grooves 222 and 223 are connected through a circulation passage 234, and both ends of the thread grooves 228 and 229 are connected through a circulation passage 235, so that the balls 221 and 227 are capable of moving regardless of the relative position of the rotor member 215 with respect to the inner body 220 and the outer body 226.

Next, explanation is made on the pad wear compensating mechanism 213. The piston 225 is threadably engaged with an adjusting threaded portion 236 in an inner circumferential surface of the inner body 220. The piston 225 is adapted to advance toward the inner pad 14 when rotated in a counterclockwise direction. In this embodiment, "counterclockwise direction" means the counterclockwise direction as viewed from the right side of FIG. 8. A solid, cylindrical sliding member 237 and a rear end portion of the piston 225 are coaxially connected as a unit by a bolt 238. A rear end portion of the inner body 220 is connected, by leaf springs 240, to a generally cylindrical pivotal member 239 which is rotatably inserted in the rotor member 215. The sliding member 237 is fitted into the pivotal member 239 with a one-way clutch 241 being provided therebetween.

Figure 14:
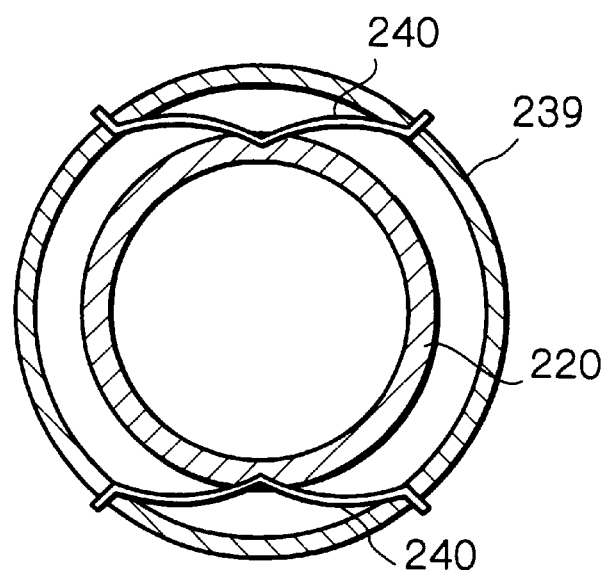
FIG. 14 is a vertical cross-sectional view of an inner body and a pivotal member of the motor-driven brake system of FIG. 8, taken along the line A—A.

As shown in FIG. 14, the pivotal member 239 is positioned relative to the inner body 220, while being resiliently biased by the leaf springs 240 in a direction of rotation. Deflection of the leaf springs 240 permits predetermined rotation of the pivotal member 239 relative to the inner body 220. The one-way clutch 241 allows the pivotal member 239 to rotate relative to the sliding member 237 only in the clockwise direction and allows the pivotal member 239 and the sliding member 237 to rotate as a unit in the counterclockwise direction. The sliding member 237 is connected to the one-way clutch 241 by splines 242 so as to be axially movable relative to the pivotal member 239 and the one-way clutch 241.

In a rear end surface of the pivotal member 239, an arcuate engaging groove 243 having a predetermined central angle is formed so as to extend in the circumferential direction of the pivotal member 239. A generally cylindrical retainer 244 is provided within the rotor member 215 so as to face a rear end portion of the pivotal member 239. The retainer 244 has an engaging pin 245 attached thereto, which is inserted in the engaging groove 243 of the pivotal member 239. When relative rotation between the rotor member 215 and the inner body 220 occurs in a predetermined range, the engaging pin 245 moves within the engaging groove 243. When the relative rotation between the rotor member 215 and the inner body 220 exceeds the predetermined range, the engaging pin 245 abuts against an end portion of the engaging groove 243 and rotates the pivotal member 239. Thus, the engaging groove 243 and the engaging pin 245 constitute a transmission mechanism for transmitting only rotational displacement of the rotor member 215 exceeding the predetermined range.

The rotation detector 214 is arranged as follows. A fixed member 247 is attached to a bracket 246 connected to the cover 217, and a rotatable member 249 is attached to the retainer 244 so as to face the fixed member 247. Based on an electromotive force or an output frequency generated according to rotation of the rotatable member 249 relative to the fixed member 247, rotational displacement of the rotor member 215, that is, rotational displacement of the rotor magnet 219 of the motor 210 is detected.

Next, explanation is made below on an operation of the motor-driven brake system in this embodiment.

In order to generate a braking force, the rotor magnet 219 of the motor 210 rotates the rotor member 215 in the clockwise direction in response to the control signal from the controller (not shown), so that the balls 221 of the first ball screw mechanism 211 and the balls 227 of the second ball screw mechanism 212 roll within the space formed by the thread grooves 222 and 223 and the space formed by the thread grooves 228 and 229, respectively, so as to move the inner body 220 and the outer body 226 in opposite directions along the axis of the rotor member 215. Thus, the piston 225 and the claw portion 204 press the inner and outer pads 14 and 15 against the disk 13, thereby generating a braking force. Because the torque acting on the pads 14 and 15 is supported by the carrier 12 and the caliper body 203 can be slidably moved by the slide pins 208 of the carrier 12, generation of a braking force can be effected satisfactorily, even when run-out of the disk 13 occurs or the clearance between the disk 13 and each of the pads 14 and 15 before operation of the brake system (initial pad clearance) varies (that is, the starting or initial positions of the pads 14 and 15 during braking vary). The braking force can be controlled according to rotational displacement of the rotor member 215 detected by the rotation detector 214.

The first ball screw mechanism 211 and the second ball screw mechanism 212 convert rotation to a linear motion in accordance with the same principle as that of the transmission mechanism of the conventional ball screw. However, the lead of each of the first ball screw mechanism 211 and the second ball screw mechanism 212 relative to rotational displacement is set to a satisfactorily small value, so that the transmission ratios of the first ball screw mechanism 211 and the second ball screw mechanism 212 are high. Therefore, output of the motor 210 can be reduced, leading to low power consumption and enabling a reduction in size of the motor.

In order to release the braking force, the motor 210 is operated in a reverse direction so that the rotor member 215 is rotated in the counterclockwise direction to its original position. The first ball screw mechanism 211 and the second ball screw mechanism 212 enable the inner body 220 and the outer body 226 to move in a direction for moving the piston 225 and the claw portion 204 away from the disk 13. Thus, the inner pad 14 and the outer pad 15 move away from the disk 13, to thereby release the braking force. In this instance, because the piston 225 and the claw portion 204 are moved by the first ball screw mechanism 211 and the second ball screw mechanism 212, the inner pad 14 and the outer pad 15 can be moved away from the disk 13 equally, to thereby suppress dragging.

Next, referring to FIGS. 15(A) to 15(D), an action of the pad wear compensating mechanism 213 is explained. When the inner and outer pads 14 and 15 are in an unworn state or after wear compensation has been effected in a manner as mentioned below, the rotor member 215 pivots in a predetermined range between its non-braking position (when the inner and outer pads 14 and 15 are located at their starting or initial positions before operation of the brake system) and its braking position (when the inner and outer pads 14 and 15 press against the disk 13). In this case, the engaging pin 245 also moves in a predetermined range between its non-braking position (shown in FIG. 15(A)) and its braking position (shown in FIG. 15(B)) within the engaging groove 243.

Figure 15A:
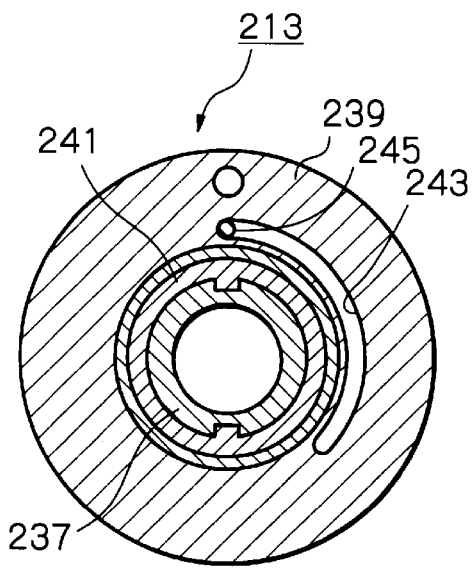
FIGS. 15(A), 15(B), 15(C) and 15(D) are views explaining the action of a pad wearing compensating mechanism of the brake system of FIG. 8.
Figure 15B:
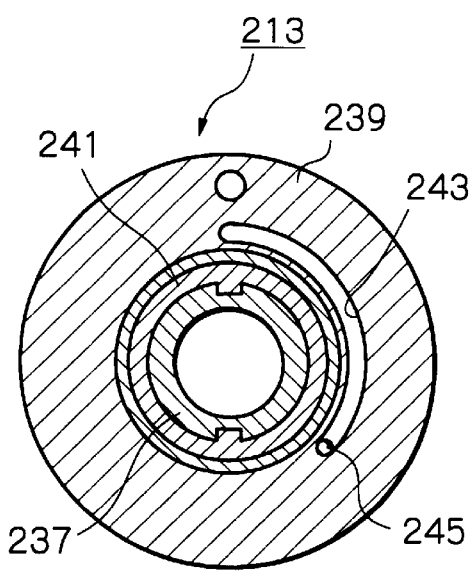
Figure 15C:
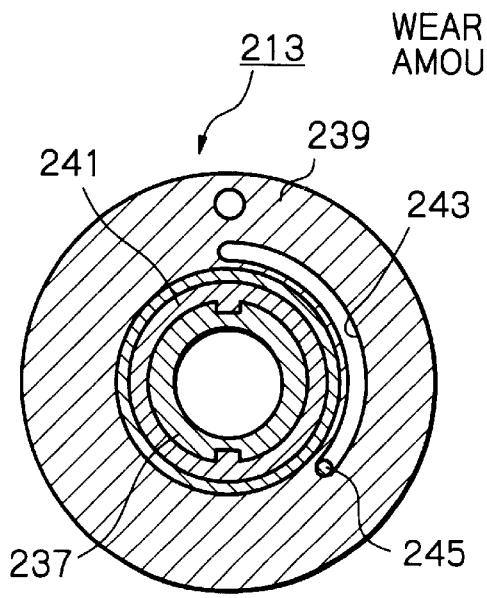
Figure 15D:
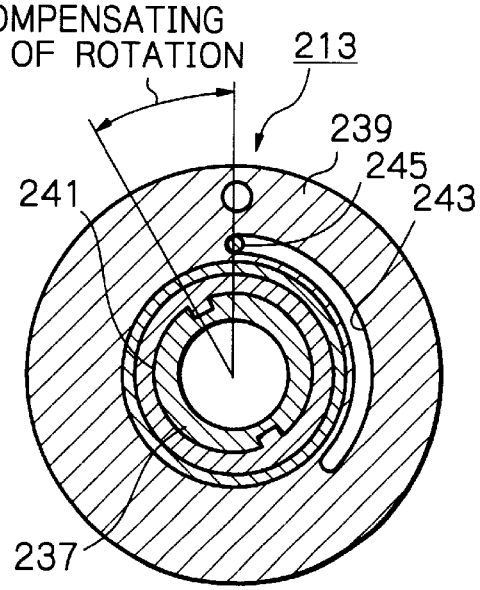

When at least one of the inner and outer pads 14 and 15 has been worn, during braking, the amount of displacement of the rotor member 215 increases by the amount corresponding to the amount of wear and the engaging pin 245 abuts against the end portion of the engaging groove 243, to thereby rotate the pivotal member 239 in the clockwise direction from the position as shown in FIG. 15(C). In this instance, the one-way clutch 241 allows the pivotal member 239 to rotate relative to the sliding member 237 in the clockwise direction, so that no rotation of the sliding member 237 occurs, that is, no rotation of the piston 225 occurs. Thereafter, when the braking force has been released and the engaging pin 245 moves toward its non-braking position, the pivotal member 239 is rotated in the counterclockwise direction to its original position, by the biasing forces of the leaf springs 240. In this instance, the one-way clutch 241 inhibits relative rotation between the sliding member 237 and the pivotal member 239, so that the sliding member 237, together with the pivotal member 239, rotates in the counterclockwise direction to thereby rotate the piston 225 in the counterclockwise direction (as shown in FIG. 15(D)). Consequently, the adjusting threaded portion 236 moves the piston 225 toward the inner pad 14 by a distance corresponding to the amount of wear of the worn pad.

Thus, the piston 225 moves toward the inner pad 14 by a distance corresponding to the amount of wear of the worn pad. Therefore, it is possible to compensate the wear of the worn pad even when the strokes of the first ball screw mechanism 211 and the second ball screw mechanism 212 are short, thus enabling the pads to have a long lifetime.

Incidentally, in the above-mentioned four embodiments, the first and second pad pressing members may be fixedly attached to the back plates of the pads.

As has been described above, in the motor-driven brake system in the fourth embodiment of the present invention, the piston and the claw portion are moved by the first and second ball screw mechanisms, so that the pads disposed at opposite sides of the disk can be moved toward and away from the disk equally to generate and release braking forces, to thereby prevent dragging.

Further, the transmission ratios of the first and second ball screw mechanisms are high, so that output of the electric motor can be reduced, leading to low power consumption and enabling a reduction in size of the motor.

In addition, because the pad wear compensating mechanism is provided, when at least one of the pads has been worn and rotation of the rotor member rotated by the electric motor exceeds a predetermined range during movement of the pads in a direction for generating a braking force, the rotation of the rotor member during movement of the pads in a direction for releasing the braking force is transmitted to the adjusting threaded portion, so that the piston advances toward the disk so as to adjust the pad clearance. Therefore, it is possible to compensate the wear of the worn pad even when the strokes of the first ball screw mechanism and the second ball screw mechanism are short, thus enabling the pads to have a long lifetime.

The entire disclosure of each of Japanese Patent Application No. Hei 10-82219 filed on Mar. 27, 1998 and Japanese Patent Application No. Hei 10-341055 filed on Nov. 13, 1998 is incorporated herein by reference in its entirety.

What is claimed is:

1. A motor-driven brake system comprising:

a first pad and a second pad disposable at axially opposite sides of a disk, wherein each of said first and second pads has two opposite facing surfaces, with one of said two opposite facing surfaces of each of said first and second pads being adapted to abut against the disk;

a caliper for applying a force to the other of said two opposite facing surfaces of each of said first and second pads such that said one of said two opposite facing surfaces of each of said first and second pads abuts against the disk, with said caliper including a housing that is capable of being mounted on a non-rotatable portion of a vehicle body;

a motor contained in said housing;

an output portion adapted to be rotatably driven by said motor;

a converting device for converting rotation of said output portion to linear motion, with said converting device including a first threaded portion and a second threaded portion which have a directionally reverse relationship with one another;

a first pad pressing member to be disposed at one of the axially opposite sides of the disk and having a first end engaged with said first threaded portion, and also having a second end capable of applying a force to the other of said two opposite facing surfaces of said first pad; and a second pad pressing member to be extended across an outer periphery of the disk and having a first end engaged with said second threaded portion, and also having a second end capable of applying a force to the other of said two opposite facing surfaces of said second pad; wherein said first pad pressing member and said second pad pressing member are separate from said caliper such that said first pad pressing member and said second pad pressing member are linearly reciprocable along the axis of the disk relative to said housing, so that one of said first and second pad pressing members is movable in a direction that is opposite to the direction in which the other of said first and second pad pressing member is movable.

2. The motor-driven brake system according to claim 1, wherein said motor comprises a single electric motor.

3. The motor-driven brake system according to claim 2, wherein said first threaded portion includes a first externally threaded portion on said output portion and a first internally threaded portion on said first pad pressing member, with said first externally threaded portion being engageable with said first internally threaded portion, and wherein said second threaded portion includes a second externally threaded portion on said output portion and a second internally threaded portion on said second pad pressing member, with said second externally threaded portion being engageable with said second internally threaded portion.

4. The motor-driven brake system according to claim 2, wherein each of said first threaded portion and said second threaded portion includes a ball screw structure.

5. The motor-driven brake system according to claim 4, wherein said ball screw structure includes a thread groove having a length of less than one pitch.

6. The motor-driven brake system according to claim 2, further comprising a pad wear compensating mechanism for adjusting starting positions of said first and second pads along the axis of the disk before operation of said first and second pad pressing members such that when an amount of rotation of said output portion exceeds a predetermined level during movement of said first and second pads toward the disk via operation of said first and second pad pressing members, the starting positions of said first and second pads are adjusted to positions that are closer to the disk relative to the starting positions of said first and second pads before the amount of rotation of said output portion exceeds the predetermined level.

7. The motor-driven brake system according to claim 6, wherein said output portion comprises a cylindrical rotor member having a distal end portion and a base end portion, with said cylindrical rotor member receiving said first pad pressing member on a side of said distal end portion via said first threaded portion and also receiving said pad wear compensating mechanism on a side of said base end portion, wherein said first pad pressing member comprises a generally cylindrical inner body adapted to be reciprocally moved by said first threaded portion, and a piston threadably engaged with an inner circumferential surface of said generally cylindrical inner body, with said piston having a distal end associated with said first pad and a base end associated with said pad wear compensating mechanism, and wherein said pad wear compensating mechanism comprises a detection device for detecting an amount of wear of at least one of said first and second pads, and a one-way rotation transmitting device for preventing a rotation transmission path from said cylindrical rotor member to said piston when said cylindrical rotor member rotates in one direction during movement of said first and second pads toward the disk via operation of said first and second pad pressing members, and for establishing a rotation transmission path from said cylindrical rotor member to said piston when said cylindrical rotor member rotates in a direction opposite to the one direction during movement of said first and second pads away from the disk via operation of said first and second pad pressing members, such that said piston moves toward the disk relative to said generally cylindrical inner body by a distance corresponding to an amount of wear of said at least one of said first and second pads.

8. The motor-driven brake system according to claim 2, wherein said caliper includes an attachment device for attachment of said caliper in a manner that allows for floating movement of said caliper relative to the non-rotatable portion of the vehicle body.

9. The motor-driven brake system according to claim 2, wherein said caliper includes a fixing device for fixing said caliper relative to the non-rotatable portion of the vehicle body.

10. A motor-driven brake system for generating and releasing braking forces by reciprocal movement of a pair of pads disposed at opposite sides of a disk having an axis, wherein the pads are arranged to move toward and away from the disk along the axis, said motor-driven brake system comprising:

a motor;

a caliper for housing said motor;

an output portion adapted to be rotatably driven by said motor;

a first pad pressing member for pressing the first pad against the disk;

a second pad pressing member for pressing the second pad against the disk;

a first converting device for converting rotation of said output portion to linear motion such that said first pad pressing member moves reciprocally along the axis of the disk; and a second converting device for converting rotation of said output portion to linear motion such that said second pad pressing member moves reciprocally along the axis of the disk; wherein said first pad pressing member and said second pad pressing member are separate from said caliper such that said first and second pad pressing members are each reciprocable relative to said caliper.

11. The motor-driven brake system according to claim 10, wherein said motor comprises a single electric motor.

12. The motor-driven brake system according to claim 11, wherein said caliper includes an attachment device for attachment of said caliper in a manner that allows for floating movement of said caliper relative to a non-rotatable portion of a vehicle body.

13. The motor-drivenbrake system according to claim 12, wherein said single electric motor includes an output shaft that constitutes said output portion, with said output shaft having a small-diameter distal end portion and a large-diameter base end portion, with said small-diameter distal end portion including a first externally threaded portion and said large-diameter base end portion including a second externally threaded portion, wherein said first pad pressing member has a first internally threaded portion on a base end portion thereof, and said second pad pressing member has a second internally threaded portion on base end portion thereof with said first converting device including said first externally threaded portion and said first internally threaded portion, said second converting device including said second externally threaded portion and said second internally threaded portion, and said first externally threaded portion and said second externally threaded portion having equal leads and having a directionally reverse relationship with one another.

14. The motor-driven brake system according to claim 11, wherein said caliper includes a fixing device for fixing said caliper relative to a non-rotatable portion of a vehicle body.

15. The motor-drivenbrake system according to claim 14, wherein said single electric motor has an output shaft, with said output portion comprising said output shaft, a rotation transmitting member and a sliding mechanism portion for permitting relative axial movement between said rotation transmitting member and said output shaft while restricting relative rotational movement therebetween, with said rotation transmitting member having a small-diameter distal end portion and a large-diameter base end portion, and with said small-diameter distal end portion including a first externally threaded portion and said large-diameter base end portion including a second externally threaded portion, wherein said first pad pressing member has a first internally threaded portion on a base end portion thereof, and said second pad pressing member has a second internally threaded portion on a base end portion thereof, with said first converting device including said first externally threaded portion and said first internally threaded portion, said second converting device including said second externally threaded portion and said second internally threaded portion, and said first externally threaded portion and said second externally threaded portion having equal leads and having a directionally reverse relationship with one another.

16. The motor-driven brake system according to claim 11, wherein said first converting device comprises a first ball screw mechanism positioned between said output portion and said first pad pressing member, and said second converting device comprises a second ball screw mechanism positioned between said output portion and said second pad pressing member.

17. The motor-driven brake system according to claim 16, wherein said output portion comprises a generally cylindrical output member adapted to be rotatably driven by said single electric motor, a stepped cylindrical rotation transmitting member having a small-diameter portion and a large diameter portion, with said small-diameter portion being disposed within said generally cylindrical output member, and a sliding mechanism portion connecting said generally cylindrical output member and said small-diameter portion such that axial movement of said rotation transmitting member relative to said generally cylindrical output member is permitted while relative rotation between said rotation transmitting member and said generally cylindrical output member is restricted, wherein said first pad pressing member includes an abutment portion for abutting against the first pad and an insert portion extending within said rotation transmitting member for engaging an inner circumferential source of said rotation transmitting member, wherein said second pad pressing member includes a claw portion for abutting against the second pad, a cylindrical portion for engaging an outer circumferential surface of said rotation transmitting member, and a disk pass for extending across the pads and the disk, with said disk pass being positioned between said claw portion and said cylindrical portion, and wherein said first ball screw mechanism is positioned between said inner circumferential surface of said rotation transmitting member and said insert portion, and said second ball screw mechanism is positioned between said outer circumferential surface of said rotation transmitting member and said cylindrical portion.

18. The motor-driven brake system according to claim 16, wherein said first converting device includes a first internally threaded portion on an inner periphery of said output portion, a first externally threaded portion on an outer periphery of said first pad pressing member, and balls disposed between said first internally threaded portion and said first externally threaded portion, and wherein said second converting device includes a second externally threaded portion on an outer periphery of said output portion, a second internally threaded portion on an inner periphery of said second pad pressing member, and balls disposed between said second internally threaded portion and said second externally threaded portion.

19. The motor-driven brake system according to claim 16, wherein said first converting device includes a first internal thread groove on an inner periphery of said output portion, a first external thread groove on an outer periphery of said first pad pressing member, and balls disposed between said first internal thread groove and said first external thread groove, and wherein said second converting device includes a second external thread groove on an outer periphery of said output portion, a second internal thread groove on an inner periphery of said second pad pressing member, and balls disposed between said second internal thread groove and said second external thread groove.

20. The motor-driven brake system according to claim 19, wherein each of said first internal and external thread grooves and each of said second internal and external thread grooves have a length of less than one pitch.

21. The motor-driven brake system according to claim 11, wherein an initial pad clearance between the disk and each of the first and second pads is predetermined, and wherein said motor-driven brake system further comprises a pad wear compensating mechanism for adjusting initial positions of the first and second pads such that when at least one of the first and second pads has become worn, the initial position of each of the pads is changed by a distance corresponding to an amount of wear of the at least one won pad, whereby the initial pad clearance is maintained.

22. The motor-driven brake system according to claim 21, wherein said output portion comprises a cylindrical rotor member having a distal end portion and a base end portion, with said cylindrical rotor member receiving said first pad pressing member on a side of said distal end portion via said first converting device and also receiving said pad wear compensating mechanism on a side of said base end portion, wherein said first pad pressing member comprises a generally cylindrical inner body adapted to be reciprocally moved by said first converting device, and a piston threadably engaged with an inner circumferential surface of said generally cylindrical inner body, with said piston having a distal end associated with said first pad and a base end associated with said pad wear compensating mechanism, and wherein said pad wear compensating mechanism comprises a detection device for detecting an amount of wear of at least one of the first and second pads, and a one-way rotation transmitting device for preventing a rotation transmission path from said rotor member to said piston when said rotor member rotates in one direction during movement of said first and second pads toward the disk via operation of said first and second pad pressing members, and for establishing a rotation transmission path from said cylindrical rotor member to said piston when said cylindrical rotor member rotates in a direction opposite to the one direction during movement of the first and second pads away from the disk via operation of said first and second pad pressing members, such that said piston moves toward the disk relative to said generally cylindrical inner body by a distance corresponding to an amount of wear of said at least one of the first and second pads.

23. The motor-driven brake system according to claim 22, wherein said detection device comprises a generally cylindrical pivotal member rotatably provided within said rotor member, a spring member for resiliently holding said generally cylindrical pivotal member relative to said generally cylindrical inner body such that a predetermined rotation of said generally cylindrical pivotal member relative to said generally cylindrical inner body is permitted, an arcuate engaging groove provided in said generally cylindrical pivotal member and having a starting end and a terminal end, and an engaging pin attached to said rotor member such that as the pads move towards the disk via operation of said first and second pad pressing members said engaging pin is moved within said arcuate engaging groove from said starting end to said terminal end, and such that as the pads move away from the disk via operation of said first and second pad pressing members said engaging pin is moved within said arcuate engaging groove from said terminal end to said starting end, wherein said arcuate engaging groove is dimensioned such that when the first and second pads are in a predetermined unworn state said engaging pin applies no pressure to said terminal end during the movement of the pads towards the disk via operation of said first and second pad pressing members, and when at least one of the pads is in a predetermined worn state said engaging pin applies pressure to said terminal end during movement of the pads towards the disk via operation of said first and second pad pressing members, whereby said generally cylindrical pivotal member is rotated, and wherein said rotation transmitting device comprises a solid generally cylindrical sliding member fixed to said piston on a side of said single electric motor and provided with said generally cylindrical pivotal member, and a one-way clutch positioned between said generally cylindrical pivotal member and said sliding member and fixed relative to said generally cylindrical pivotal member while engaging said sliding member in a manner that permits axial movement of said sliding member, with said one-way clutch being adapted to prevent a rotation transmission path from said generally cylindrical pivotal member to said sliding member when said generally cylindrical pivotal member rotates in one direction during movement of the pads towards the disk via operation of said first and second pad pressing members, and also being adapted to establish the rotation transmission path from said generally cylindrical pivotal member to said sliding member when the generally cylindrical pivotal member rotates in a direction opposite to the one direction during movement of the pads away from the disk via operation of said first and second pad pressing members.

24. The motor-driven brake system according to claim 20, wherein a diameter of each of said balls is larger than the pitch of said thread grooves.

25. The motor-driven brake system according to claim 20, wherein both ends of said first thread grooves are connected through a first circulation passage and both ends of said second thread grooves are connected through a second circulation passage such that said balls can be circulated.

* * * * *